United States Patent [19]

Chan et al.

[11] Patent Number: 5,021,987

[45] Date of Patent: Jun. 4, 1991

[54] CHAIN-SERIAL MATRIX MULTIPLIERS

[75] Inventors: David S. K. Chan, Schenectady; Daniel A. Staver, Scotia, both of N.Y.

[73] Assignee: General Electric Company, Schenectady, N.Y.

[21] Appl. No.: 401,581

[22] Filed: Aug. 31, 1989

[51] Int. Cl.[5] .......................................... G06F 15/347
[52] U.S. Cl. .................................................. 364/754
[58] Field of Search ............................... 364/754, 736

[56] References Cited

U.S. PATENT DOCUMENTS

| 3,748,451 | 7/1973 | Ingwersen | 364/728.01 |
| 4,697,247 | 9/1987 | Grinberg et al. | 364/754 |
| 4,841,469 | 6/1989 | Kuenemund et al. | 364/754 |

OTHER PUBLICATIONS

*Reference Data for Radio Engineers,* International Telephone & Telegraph Corp., pp. 1090–1097.

Primary Examiner—David H. Malzahn
Attorney, Agent, or Firm—Allen L. Limberg; James C. Davis, Jr.; Marvin Snyder

[57] ABSTRACT

Digital electronic apparatus for performing chain-serial matrix multiplications using a single pipeline multiplier supplies elements of the multiplicand and multiplier matrices to the digital memory from first and second memories. Each product matrix is temporarily stored in a third memory until such time as it is used to write the first memory for the next matrix multiplication in the series. This procedure avoids overwriting the first memory when its data are still required for application to the pipeline multiplier.

38 Claims, 17 Drawing Sheets

Fig. 3

| STEP NO. | $C_1$ | $C_2$ | $C_3$ | ... | $C_5$ | ... | $C_9$ |
|---|---|---|---|---|---|---|---|
| 1 | 1 | 0 | 0 | ... | 1 | ... | 1 |
| 2 | 1 | 0 | 0 | ... | 1 | ... | 1 |
| 3 | 1 | 0 | 0 | ... | 1 | ... | 1 |
| 4 | 0 | 1 | 0 | ... | 1 | ... | 1 |
| 5 | 0 | 1 | 0 | ... | 1 | ... | 1 |
| 6 | 0 | 1 | 0 | ... | 1 | ... | 1 |
| 7 | 0 | 0 | 1 | ... | 1 | ... | 1 |
| 8 | 0 | 0 | 1 | ... | 1 | ... | 1 |
| 9 | 0 | 0 | 1 | ... | 1 | ... | 1 |

Fig. 4

| STEP NO. | $C_1$ | $C_2$ | $C_3$ | $C_4$ | $C_5$ | $C_6$ | $C_7$ | $C_8$ | $C_9$ |
|---|---|---|---|---|---|---|---|---|---|
| 1 | 0 | 0 | 0 | 1 | 1 | 1 | 0 | 1 | 0 |
| 2 | 0 | 0 | 0 | 1 | 1 | 0 | 0 | 1 | 0 |
| 3 | 0 | 0 | 0 | 1 | 1 | 0 | 1 | 1 | 0 |
| 4 | 0 | 0 | 0 | 1 | 1 | 1 | 0 | 1 | 0 |
| 5 | 0 | 0 | 0 | 1 | 1 | 0 | 0 | 1 | 0 |
| 6 | 0 | 0 | 0 | 1 | 1 | 0 | 1 | 1 | 0 |
| 7 | 1 | 0 | 0 | 1 | 1 | 1 | 0 | 1 | 0 |
| 8 | 1 | 0 | 0 | 1 | 1 | 0 | 0 | 1 | 0 |
| 9 | 1 | 0 | 0 | 1 | 1 | 0 | 1 | 1 | 0 |
| 10 | 0 | 0 | 0 | 0 | 1 | 1 | 0 | 0 | 0 |
| 11 | 0 | 0 | 0 | 0 | 1 | 0 | 0 | 0 | 0 |
| 12 | 0 | 0 | 0 | 0 | 1 | 0 | 1 | 0 | 0 |
| 13 | 0 | 0 | 0 | 0 | 1 | 1 | 0 | 0 | 0 |
| 14 | 0 | 0 | 0 | 0 | 1 | 0 | 0 | 0 | 0 |
| 15 | 0 | 0 | 0 | 0 | 1 | 0 | 1 | 0 | 0 |
| 16 | 0 | 1 | 0 | 0 | 1 | 1 | 0 | 0 | 0 |
| 17 | 0 | 1 | 0 | 0 | 1 | 0 | 0 | 0 | 0 |
| 18 | 0 | 1 | 0 | 0 | 1 | 0 | 1 | 0 | 0 |
| 19 | 0 | 0 | 0 | x | 0 | 1 | 0 | 0 | 0 |
| 20 | 0 | 0 | 0 | x | 0 | 0 | 0 | 0 | 0 |
| 21 | 0 | 0 | 0 | x | 0 | 0 | 1 | 0 | 0 |
| 22 | 0 | 0 | 0 | x | 0 | 1 | 0 | 0 | 0 |
| 23 | 0 | 0 | 0 | x | 0 | 0 | 0 | 0 | 0 |
| 24 | 0 | 0 | 0 | x | 0 | 0 | 1 | 0 | 0 |
| 25 | 0 | 0 | 1 | x | 0 | 1 | 0 | 0 | 0 |
| 26 | 0 | 0 | 1 | x | 0 | 0 | 0 | 0 | 0 |
| 27 | 0 | 0 | 1 | x | 0 | 0 | 1 | 0 | 0 |

Fig. 5

| STEP NO. | 301 | 302 |
|---|---|---|
| 1 | OLD | OLD |
| 2 | OLD | OLD |
| 3 | OLD | OLD |
| 4 | $C_{11}$ | OLD |
| 5 | OLD | $C_{11}$ |
| 6 | $C_{11}$ | OLD |
| 7 | $C_{12}$ | $C_{11}$ |
| 8 | $C_{11}$ | $C_{12}$ |
| 9 | $C_{12}$ | $C_{11}$ |
| 10 | $C_{13}$ | $C_{12}$ |
| 11 | $C_{12}$ | $C_{13}$ |
| 12 | $C_{13}$ | $C_{12}$ |
| 13 | $C_{21}$ | $C_{13}$ |
| 14 | $C_{13}$ | $C_{21}$ |
| 15 | $C_{21}$ | $C_{13}$ |
| 16 | $C_{22}$ | $C_{21}$ |
| 17 | $C_{21}$ | $C_{22}$ |
| 18 | $C_{22}$ | $C_{21}$ |
| 19 | $C_{23}$ | $C_{22}$ |
| 20 | $C_{22}$ | $C_{23}$ |
| 21 | $C_{23}$ | $C_{22}$ |
| 22 | $C_{31}$ | $C_{23}$ |
| 23 | $C_{23}$ | $C_{31}$ |
| 24 | $C_{31}$ | $C_{23}$ |
| 25 | $C_{32}$ | $C_{31}$ |
| 26 | $C_{31}$ | $C_{32}$ |
| 27 | $C_{32}$ | $C_{31}$ |
| 1 | $C_{33}$ | $C_{32}$ |
| 2 | $C_{32}$ | $C_{33}$ |
| 3 | $C_{33}$ | $C_{32}$ |
| 4 | NEW | $C_{33}$ |
| 5 | $C_{33}$ | NEW |
| 6 | NEW | $C_{33}$ |
| 7 | NEW | NEW |

Fig. 6

| STEP NO. | $C_1$ | $C_2$ | $C_3$ | $C_4$ | $C_5$ | $C_6$ | $C_7$ | $C_9$ |
|---|---|---|---|---|---|---|---|---|
| 1 | 0 | 0 | 0 | 1 | 1 | 1 | 0 | 0 |
| 2 | 0 | 0 | 0 | 1 | 1 | 0 | 0 | 0 |
| 3 | 0 | 0 | 0 | 1 | 1 | 0 | 1 | 0 |
| 4 | 0 | 0 | 0 | 1 | 1 | 1 | 0 | 0 |
| 5 | 0 | 0 | 0 | 1 | 1 | 0 | 0 | 0 |
| 6 | 0 | 0 | 0 | 1 | 1 | 0 | 1 | 0 |
| 7 | 0 | 0 | 0 | 1 | 1 | 1 | 0 | 0 |
| 8 | 0 | 0 | 0 | 1 | 1 | 0 | 0 | 0 |
| 9 | 0 | 0 | 0 | 1 | 1 | 0 | 1 | 0 |
| 10 | 0 | 0 | 0 | 0 | 1 | 1 | 0 | 0 |
| 11 | 0 | 0 | 0 | 0 | 1 | 0 | 0 | 0 |
| 12 | 0 | 0 | 0 | 0 | 1 | 0 | 1 | 0 |
| 13 | 0 | 0 | 0 | 0 | 1 | 1 | 0 | 0 |
| 14 | 0 | 0 | 0 | 0 | 1 | 0 | 0 | 0 |
| 15 | 0 | 0 | 0 | 0 | 1 | 0 | 1 | 0 |
| 16 | 0 | 0 | 0 | 0 | 1 | 1 | 0 | 0 |
| 17 | 0 | 0 | 0 | 0 | 1 | 0 | 0 | 0 |
| 18 | 0 | 0 | 0 | 0 | 1 | 0 | 1 | 0 |
| 19 | 1 | 0 | 0 | x | 0 | 1 | 0 | 0 |
| 20 | 1 | 0 | 0 | x | 0 | 0 | 0 | 0 |
| 21 | 1 | 0 | 0 | x | 0 | 0 | 1 | 0 |
| 22 | 0 | 1 | 0 | x | 0 | 1 | 0 | 0 |
| 23 | 0 | 1 | 0 | x | 0 | 0 | 0 | 0 |
| 24 | 0 | 1 | 0 | x | 0 | 0 | 1 | 0 |
| 25 | 0 | 0 | 1 | x | 0 | 1 | 0 | 0 |
| 26 | 0 | 0 | 1 | x | 0 | 0 | 0 | 0 |
| 27 | 0 | 0 | 1 | x | 0 | 0 | 1 | 0 |

Fig. 7

| STEP NO. | 301 | 302 | 303 | 304 | 305 | 306 | 307 | 308 |
|---|---|---|---|---|---|---|---|---|
| 1 | OLD | OLD | OLD | OLD | OLD | OLD | OLD | OLD |
| 2 | OLD | OLD | OLD | OLD | OLD | OLD | OLD | OLD |
| 3 | OLD | OLD | OLD | OLD | OLD | OLD | OLD | OLD |
| 4 | $f_{11}$ | OLD | OLD | OLD | OLD | OLD | OLD | OLD |
| 5 | OLD | $f_{11}$ | OLD | OLD | OLD | OLD | OLD | OLD |
| 6 | OLD | OLD | $f_{11}$ | OLD | OLD | OLD | OLD | OLD |
| 7 | $f_{12}$ | OLD | OLD | $f_{11}$ | OLD | OLD | OLD | OLD |
| 8 | OLD | $f_{12}$ | OLD | OLD | $f_{11}$ | OLD | OLD | OLD |
| 9 | OLD | OLD | $f_{12}$ | OLD | OLD | $f_{11}$ | OLD | OLD |
| 10 | $f_{13}$ | OLD | OLD | $f_{12}$ | OLD | OLD | $f_{11}$ | OLD |
| 11 | OLD | $f_{13}$ | OLD | OLD | $f_{12}$ | OLD | OLD | $f_{11}$ |
| 12 | $f_{11}$ | OLD | $f_{13}$ | OLD | OLD | $f_{12}$ | OLD | OLD |
| 13 | $f_{21}$ | $f_{11}$ | OLD | $f_{13}$ | OLD | OLD | $f_{12}$ | OLD |
| 14 | OLD | $f_{21}$ | $f_{11}$ | OLD | $f_{13}$ | OLD | OLD | $f_{12}$ |
| 15 | $f_{12}$ | OLD | $f_{21}$ | $f_{11}$ | OLD | $f_{13}$ | OLD | OLD |
| 16 | $f_{22}$ | $f_{12}$ | OLD | $f_{21}$ | $f_{11}$ | OLD | $f_{13}$ | OLD |
| 17 | OLD | $f_{22}$ | $f_{12}$ | OLD | $f_{21}$ | $f_{11}$ | OLD | $f_{13}$ |
| 18 | $f_{13}$ | OLD | $f_{22}$ | $f_{12}$ | OLD | $f_{21}$ | $f_{11}$ | OLD |
| 19 | $f_{23}$ | $f_{13}$ | OLD | $f_{22}$ | $f_{12}$ | OLD | $f_{21}$ | $f_{11}$ |
| 20 | $f_{11}$ | $f_{23}$ | $f_{13}$ | OLD | $f_{22}$ | $f_{12}$ | OLD | $f_{21}$ |
| 21 | $f_{21}$ | $f_{11}$ | $f_{23}$ | $f_{13}$ | OLD | $f_{22}$ | $f_{12}$ | OLD |
| 22 | $f_{31}$ | $f_{21}$ | $f_{11}$ | $f_{23}$ | $f_{13}$ | OLD | $f_{22}$ | $f_{12}$ |
| 23 | $f_{12}$ | $f_{31}$ | $f_{21}$ | $f_{11}$ | $f_{23}$ | $f_{13}$ | OLD | $f_{22}$ |
| 24 | $f_{22}$ | $f_{12}$ | $f_{31}$ | $f_{21}$ | $f_{11}$ | $f_{23}$ | $f_{13}$ | OLD |
| 25 | $f_{32}$ | $f_{22}$ | $f_{12}$ | $f_{31}$ | $f_{21}$ | $f_{11}$ | $f_{23}$ | $f_{13}$ |
| 26 | $f_{13}$ | $f_{32}$ | $f_{22}$ | $f_{12}$ | $f_{31}$ | $f_{21}$ | $f_{11}$ | $f_{23}$ |
| 27 | $f_{23}$ | $f_{13}$ | $f_{32}$ | $f_{22}$ | $f_{12}$ | $f_{31}$ | $f_{21}$ | $f_{11}$ |
| 1 | $f_{33}$ | $f_{23}$ | $f_{13}$ | $f_{32}$ | $f_{22}$ | $f_{12}$ | $f_{31}$ | $f_{21}$ |
| 2 | $f_{21}$ | $f_{33}$ | $f_{23}$ | $f_{13}$ | $f_{32}$ | $f_{22}$ | $f_{12}$ | $f_{31}$ |
| 3 | $f_{31}$ | $f_{21}$ | $f_{33}$ | $f_{23}$ | $f_{13}$ | $f_{32}$ | $f_{22}$ | $f_{12}$ |
| 4 | NEW | $f_{31}$ | $f_{21}$ | $f_{33}$ | $f_{23}$ | $f_{13}$ | $f_{32}$ | $f_{22}$ |
| 5 | $f_{22}$ | NEW | $f_{31}$ | $f_{21}$ | $f_{33}$ | $f_{23}$ | $f_{13}$ | $f_{32}$ |

Fig. 12

| STEP NO. | $C_1$ | $C_2$ | $C_3$ | $C_4$ |
|---|---|---|---|---|
| 1 | 1 | 0 | 0 | 0 |
| 2 | 0 | 0 | 0 | 0 |
| 3 | 1 | 0 | 0 | 0 |
| 4 | 0 | 0 | 0 | 0 |
| 5 | 1 | 0 | 0 | 0 |
| 6 | 0 | 0 | 0 | 1 |
| 7 | 1 | 0 | 0 | 0 |
| 8 | 0 | 0 | 0 | 0 |
| 9 | 1 | 0 | 0 | 0 |
| 10 | 0 | 0 | 0 | 0 |
| 11 | 1 | 0 | 0 | 0 |
| 12 | 0 | 0 | 0 | 1 |
| 13 | 1 | 0 | 0 | 0 |
| 14 | 0 | 0 | 0 | 0 |
| 15 | 1 | 0 | 0 | 0 |
| 16 | 0 | 0 | 0 | 0 |
| 17 | 1 | 1 | 0 | 0 |
| 18 | 0 | 1 | 0 | x |
| 19 | 1 | 1 | 0 | x |
| 20 | 0 | 1 | 0 | x |
| 21 | 1 | 1 | 0 | x |
| 22 | 0 | 1 | 0 | x |
| 23 | 1 | 1 | 0 | x |
| 24 | 0 | 1 | 0 | x |
| 25 | 1 | 1 | 1 | 1 |
| 26 | 0 | 1 | 1 | 1 |
| 27 | 1 | 1 | 1 | 1 |
| 28 | 0 | 1 | 1 | 1 |
| 29 | 1 | 1 | 1 | 1 |
| 30 | 0 | 1 | 1 | 1 |
| 31 | 1 | 1 | 1 | 1 |
| 32 | 0 | 1 | 1 | 1 |

| TEMPORARY STORAGE ELEMENTS | Step No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | 401 | | | | | | | | | | | | | | | | |
| | 402 | | | | | | | | | | | | | | | | |
| | 403 | | | | | | | | | | | | | | | | |
| | 404 | | | | | | | | | | | | | | | | |
| | 405 | | | | | | | | | | | | | | | | |
| | 406 | | | | | | | | | | | | | | | | |
| | 407 | | | | | | | | | | | | | | | | |
| | 408 | | | | | | | | | | | | | | | | |
| | 409 | | | | | | | | | | | | | | | | |
| | 410 | | | | | | | | | | | | | | | | |
| | 411 | | | | | | | | | | | | | | | | |
| | 412 | | | | | | | | | | | | A | X | D | X | G |
| | 413 | | | | | | | | | | | A | X | D | X | G | A |
| | 414 | | | | | | | | | | A | X | D | X | G | A | B |
| | 415 | | | | | | | | | A | X | D | X | G | A | B | D |
| | 416 | | | | | | | | A | X | D | X | G | A | B | D | E |
| | 417 | | | | | | | A | X | D | X | G | A | B | D | E | G |
| | 418 | | | | | | A | X | D | X | G | A | B | D | E | G | H |
| | 419 | X | X | X | X | A | X | D | X | G | X | B | X | E | X | H | X |

Fig. 13a

| | | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| TEMPORARY STORAGE ELEMENTS | 401 | | | | | | | | | | | | | | | | X |
| | 402 | | | | | | | | | | | | | | A | X | D |
| | 403 | | | | | | | | | | | | | A | X | D | A |
| | 404 | | | | | | | | | | | | A | X | D | A | G |
| | 405 | | | | | | A | X | D | X | G | A | B | D | E | G | H |
| | 406 | | | | | A | X | D | X | G | A | B | D | E | G | H | B |
| | 407 | | | | A | X | D | X | G | A | B | D | E | G | H | B | C |
| | 408 | | | A | X | D | X | G | A | B | D | E | G | H | B | C | E |
| | 409 | | A | X | D | X | G | A | B | D | E | G | H | B | C | E | F |
| | 410 | | ↑ | ↑ | ↑ | ↑ | ↑ | ↑ | ↑ | ↑ | | | | | | | |
| | 411 | | | | | | | | | | | | | | | A | X |
| | 412 | A | B | D | E | G | H | B | C | E | F | H | I | C | X | F | X |
| | 413 | B | D | E | G | H | B | C | E | F | H | I | C | X | F | X | I |
| | 414 | D | E | G | H | B | C | E | F | H | I | C | X | F | X | I | |
| | 415 | E | G | H | B | C | E | F | H | I | C | X | F | X | I | | |
| | 416 | G | H | B | C | E | F | H | I | C | X | F | X | I | | | |
| | 417 | H | B | C | E | F | H | I | C | X | F | X | I | | | | |
| | 418 | B | C | E | F | H | I | C | X | F | X | I | | | | | |
| | 419 | C | X | F | X | I | | | | | | | | | | | |
| STEP NO. | | 17 | 18 | 19 | 20 | 21 | 22 | 23 | 24 | 25 | 26 | 27 | 28 | 29 | 30 | 31 | 32 |

Fig. 13b

| | Step No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| TEMPORARY STORAGE ELEMENTS | 401 | A | A | D | D | G | G | B | B | E | E | H | H | C | C | F | F |
| | 402 | A | G | D | B | G | E | B | H | E | C | H | F | C | I | F | A |
| | 403 | G | D | B | G | E | B | H | E | C | H | F | C | I | F | A | I |
| | 404 | D | B | G | E | B | H | E | C | H | F | C | I | F | A | I | D |
| | 405 | B | C | E | F | H | I | C | A | F | D | I | G | A | B | D | E |
| | 406 | C | E | F | H | I | C | A | F | D | I | G | A | B | D | E | G |
| | 407 | E | F | H | I | C | A | F | D | I | G | A | B | D | E | G | H |
| | 408 | F | H | I | C | A | F | D | I | G | A | B | D | E | G | H | B |
| | 409 | H | I | C | A | F | D | I | G | A | B | D | E | G | H | B | C |
| | 410 | I | D | A | G | D | B | G | E | B | H | E | C | H | F | C | I |
| | 411 | D | A | G | D | B | G | E | B | H | E | C | H | F | C | I | F |
| | 412 | I | | | | | | | | | A' | X | D' | X | G' | | |
| | 413 | | | | | | | | | | A' | X | D' | X | G' | A' | |
| | 414 | | | | | | | | | | A' | X | D' | X | G' | A' | B' |
| | 415 | | | | | | | | | | A' | X | D' | X | G' | A' | B' |
| | 416 | | | | | | | | | | A' | X | D' | X | G' | A' | B' |
| | 417 | | | | | | | | | | A' | X | D' | X | G' | A' | B' |
| | 418 | | | | | | | | | | A' | X | D' | X | G' | A' | B' |
| | 419 | | | | | | | | | | A' | X | D' | X | G' | X | B' |

| STEP NO. | MUX 516 OUT | STORAGE ELEMENTS ||||||
|---|---|---|---|---|---|---|---|
| | | 420 | 421 | 422 | 423 | 424 | 425 |
| 24 | γ̇ | | | | | | |
| 25 | γ̇ | γ | | | | | |
| 26 | β̇ | | γ | | | | |
| 27 | γ̇ | β | γ | | | | |
| 28 | α̇ | | β | γ | | | |
| 29 | | α | | β | γ | | |
| 30 | | | α | β | γ | | −γ |
| 31 | | | | α | β | γ | −γ |
| 32 | | | | α | β | γ | −β |
| 1 | α | | | α | β | γ | −β |
| 2 | −β | | | α | β | γ | −β |
| 3 | α | | | α | β | γ | −β |
| 4 | −β | | | α | β | γ | −β |
| 5 | α | | | α | β | γ | −β |
| 6 | −β | | | α | β | γ | −β |
| 7 | γ | | | γ | α | β | −β |
| 8 | −α | | | γ | α | β | −α |
| 9 | γ | | | γ | α | β | −α |
| 10 | −α | | | γ | α | β | −α |
| 11 | γ | | | γ | α | β | −α |
| 12 | −α | | | γ | α | β | −α |
| 13 | β | | | β | γ | α | −α |
| 14 | −γ | | | β | γ | α | −γ |
| 15 | β | | | β | γ | α | −γ |
| 16 | −γ | | | β | γ | α | −γ |
| 17 | β | | | β | γ | α | −γ |
| 18 | −γ | | | | | | −γ |

CHAIN-SERIAL MATRIX MULTIPLIERS

This invention was made with government support under Contract No. N00019-88-C-0050 awarded by the Department of Navy. The government has certain rights in this invention.

The invention relates to digital apparatus for performing matrix multiplications and, more particularly, for performing them on a chain-serial basis using pipeline circuitry.

BACKGROUND OF THE INVENTION

The synopsis "Matrix Algebra" appearing on pages 1090–1097 of Chapter 37 of the fourth edition of *REFERENCE DATA FOR RADIO ENGINEERS* published by International Telephone and Telegraph Corporation, 67 Broad Street, New York 4, N.Y. is hereby included herein by reference. Chain-serial operation, insofar as matrix multiplication is concerned, can be sustained in two forms. In a first form of chain-serial matrix multiplication, an m row by n column original matrix is continuously updated by using it as the left hand multiplicand term in each of a succession of matrix multiplications with a right hand multiplier term that is the next one of a succession of n row by n column matrices. In a second form of chain-serial matrix multiplication, an n row by m column original matrix is continuously updated by using it as the right hand multiplier term in each of a succession of matrix multiplications with a left hand multiplicand term that is the next one of a succession of n row by n column matrices. Each successive matrix multiplication in the first form of chain-serial operation can be described by the matrix equation $(a_{ij}) \cdot (b_{ij}) = (c_{ij})$ written more explicitly as follows:

$$\begin{pmatrix} a_{11} & a_{12} & \ldots & a_{1j} & \ldots & a_{1n} \\ a_{21} & a_{22} & \ldots & a_{2j} & \ldots & a_{2n} \\ \ldots & \ldots & \ldots & \ldots & \ldots & \ldots \\ a_{i1} & a_{ij} & \ldots & a_{ij} & \ldots & a_{in} \\ \ldots & \ldots & \ldots & \ldots & \ldots & \ldots \\ a_{m1} & a_{m2} & \ldots & a_{mj} & \ldots & a_{mn} \end{pmatrix} \quad (1)$$

$$\begin{pmatrix} b_{11} & b_{12} & \ldots & b_{1j} & \ldots & b_{1n} \\ b_{21} & b_{22} & \ldots & b_{2j} & \ldots & b_{2n} \\ \ldots & \ldots & \ldots & \ldots & \ldots & \ldots \\ b_{i1} & b_{i2} & \ldots & b_{ij} & \ldots & b_{in} \\ \ldots & \ldots & \ldots & \ldots & \ldots & \ldots \\ b_{n1} & b_{n2} & \ldots & b_{ij} & \ldots & b_{nn} \end{pmatrix} =$$

$$\begin{pmatrix} c_{11} & c_{12} & \ldots & c_{1j} & \ldots & c_{1n} \\ c_{21} & c_{22} & \ldots & c_{2j} & \ldots & c_{2n} \\ \ldots & \ldots & \ldots & \ldots & \ldots & \ldots \\ c_{i1} & c_{i2} & \ldots & c_{ij} & \ldots & c_{in} \\ \ldots & \ldots & \ldots & \ldots & \ldots & \ldots \\ c_{m1} & c_{m2} & \ldots & c_{mj} & \ldots & c_{mn} \end{pmatrix}$$

In the matrix equation just above $$c_{ij} = \sum_{k=1}^{n} a_{ik} \cdot b_{kj} \quad (2)$$

where i and j are the numbers of the row and of the column respectively of each element in the $(a_{ij})$, $(b_{ij})$ and $(c_{ij})$ matrices. Note that $(b_{ij})$ is a square matrix, having n rows and n columns. The matrices $(a_{ij})$ and $(c_{ij})$ have m rows and n columns; they may be square with m equal to n, or they may not be.

Each successive matrix multiplication in the second form of chain serial operation can be described by the matrix equation $(d_{ij}) \cdot (e_{ij}) = (f_{ij})$ written more explicitly as follows:

$$\begin{pmatrix} d_{11} & d_{12} & \ldots & d_{1j} & \ldots & d_{1n} \\ d_{21} & d_{22} & \ldots & d_{2j} & \ldots & d_{2n} \\ \ldots & \ldots & \ldots & \ldots & \ldots & \ldots \\ d_{j1} & d_{j2} & \ldots & d_{ij} & \ldots & d_{in} \\ \ldots & \ldots & \ldots & \ldots & \ldots & \ldots \\ d_{n1} & d_{n2} & \ldots & d_{nj} & \ldots & d_{nn} \end{pmatrix} \quad (3)$$

$$\begin{pmatrix} e_{11} & e_{12} & \ldots & e_{1j} & \ldots & e_{1m} \\ e_{21} & e_{22} & \ldots & e_{2j} & \ldots & e_{2m} \\ \ldots & \ldots & \ldots & \ldots & \ldots & \ldots \\ e_{i1} & e_{i2} & \ldots & e_{ij} & \ldots & e_{im} \\ \ldots & \ldots & \ldots & \ldots & \ldots & \ldots \\ e_{n1} & e_{n2} & \ldots & e_{nj} & \ldots & e_{nm} \end{pmatrix} =$$

$$\begin{pmatrix} f_{11} & f_{12} & \ldots & f_{1j} & \ldots & f_{1m} \\ f_{21} & f_{22} & \ldots & f_{2j} & \ldots & f_{2m} \\ \ldots & \ldots & \ldots & \ldots & \ldots & \ldots \\ f_{i1} & f_{i2} & \ldots & f_{ij} & \ldots & f_{im} \\ \ldots & \ldots & \ldots & \ldots & \ldots & \ldots \\ f_{n1} & f_{n2} & \ldots & f_{nj} & \ldots & f_{nm} \end{pmatrix}$$

In the matrix equation just above $$f_{ij} = \sum_{k=1}^{n} d_{ik} \cdot e_{kj} \quad (4)$$

where i and j are the numbers of the row and of the column respectively of each element in the $(d_{ij})$, $(e_{ij})$ and $(f_{ij})$ matrices. Note that $(d_{ij})$ is a square matrix, having n rows and n columns. The matrices $(e_{ij})$ and $(f_{ij})$ may be square or may not be.

It is known to those familiar with matrix algebra that the product of the transposes of two square matrices transposes to the product of the two matrices multiplied in reverse order from their transposes. That is, $(a_{ij}) \cdot (b_{ij})$ is the transpose of $(b_{ji}) \cdot (a_{ji})$, where $(b_{ji})$ is the transpose of $(b_{ij})$ and where $(a_{ji})$ is the transpose of $(a_{ij})$. Accordingly, each step of matrix multiplication to be done in one of the first and second forms of chain-serial multiplication can alternatively be done in the other of those forms by transposing the matrices entering the reverse-order matrix multiplication and transposing the resulting matrix product. One can identify $(a_{ji})$ with $(e_{ij})$ and can identify $(b_{ji})$ with $(d_{ij})$. Then $(c_{ij})$ equals $(f_{ji})$, the transpose of $(f_{ij})$. While the pipeline circuitry in a chain-serial matrix multiplier may be designed particularly to suit one of the two forms of chain-serial matrix multiplication that is self-sustaining, it can be operated so as to provide the other form of chain-serial multiplication, by transposing rows and columns of the matrices involved in each matrix multiplication and by performing that multiplication in reverse order, then transposing the result.

In chain-serial matrix multipliers that embody the invention in various of its aspects, the multiplications of pairs of elements involved in the matrix multiplication are (except possibly for trivial multiplications) performed by a single multiplier. First and second streams of matrix elements are supplied to the multiplier and an ensuing accumulator, which together perform pipelined calculation of elements of the product matrix. The first stream of matrix elements is generated by scanning a first matrix as stored temporarily in and read subsequently from a first memory. This scanning may be done in row major order (i.e., by rows of elements) or in column major order (i.e., by columns of elements). The second stream of matrix elements is generated by scanning a second matrix as stored temporarily in and read subsequently from a second memory in the opposite order that said first matrix is scanned.

Where desired, transposition of the first and second matrices is easily arranged for, by transposing the order the first and second memories are written. Owing to the fact that matrices may be so easily transposed in the operation of the chain-serial matrix multipliers of the invention, a general term referring to a row or a column of a matrix is convenient to have in claiming these chain-serial matrix multipliers. Accordingly, a "line" of a matrix refers to a row of a matrix the element samples of which flow in row major order through a pipeline; and a "line" of a matrix also refers to a column of a matrix the element samples of which flow in column major order through a pipeline.

A type of memory that is convenient to use in pipelined operations involving arrays of data, such as those involved in finite-impulse-response filtering in one or more dimensions, is so-called "serial memory". Serial memory comprises a plurality of clocked delay elements, connected one after the other in cascade connection to form a tapped delay line. Each delay element exhibits a one clock interval delay between its input and output ports and provides for temporary storage of a respective sample. A multiplexer selectively connects to the input port of the first delay element in the cascade connection (i.e., the initial tap of the delay line) either a sample being written into the serial memory or a sample supplied from the output port of the last delay element in the cascade connection. The latter selection by the multiplexer provides for a circulating delay line, or ring connection of the delay elements, which sustains continuing storage of the samples written into the serial memory. Samples may be read from the serial memory at any tap along the tapped delay line (e.g., the initial tap or the final tap).

SUMMARY OF THE INVENTION

Aspects of the invention concern serial memory used to temporarily store samples that are written serially to memory every $k^{th}$ sample interval, which samples describe an element by element scanning of a matrix in a prescribed pattern, k being an integer at least two that is a submultiple of the quantity one plus the number of samples temporarily stored in the serial memory. Reading successive samples from the serial memory during selected intervals of time provides for useful reordering of the matrix elements in time and as they map from time to position in a matrix. For example, transposition of the rows and columns of an m row by n column matrix can be carried out by scanning the elements of the matrix in row major order and writing each element every $m^{th}$ sample interval to a serial memory comprising a cascade connection of delay elements for storing just (mn−1) samples. Serial memories used in such manner are useful as subcombinations in chain-serial matrix multipliers embodying the invention in other of its aspects.

Another aspect of the invention concerns the use of serial memories in performing matrix multiplication.

The invention in a principal one of its aspects has as its object providing for chain-serial matrix multiplication wherein the multiplication of elements in multiplicand matrices by elements in multiplier matrices using a number of means for multiplying substantially fewer than the number of elements in one of these matrices. This principal aspect of the invention is, for example, embodied in a chain-serial matrix multiplier including one means for multiplying that performs all element by element multiplications (except, possibly, trivial ones) and one means for accumulating groups of products of pairs of elements to generate elements of the next successively calculated matrix. A first memory temporarily stores the elements of the original matrix and is updated periodically for temporarily storing the elements of the successively calculated matrices. A second memory temporarily stores each successive square matrix used for the updating calculations. The first and second memories are read synchronously to supply pairs of elements to the means for multiplying. Pipelining of the calculations provides for chain-serial matrix multiplier apparatus that is economical of digital hardware, and such pipelining is made possible by a third memory that temporarily stores the elements of the new matrix as they are calculated until such time as they may replace the elements of the old matrix temporarily stored in the first memory, without losing elements that must still be supplied to said means for multiplying. In preferred embodiments of this embodiment of the invention the first, second and third memories comprise serial memories.

BRIEF DESCRIPTION OF THE DRAWING

FIG. 3 is a table of control signal values for the FIG. 1 or FIG. 2 chain-serial matrix multiplier, used during an initializing operation.

FIG. 4 is a table of control signal values for the FIG. 1 chain-serial matrix multiplier, used during each cycle of continuing operation after the cycle of initializing operation.

FIG. 5 is a table of third memory contents for the FIG. 1 chain-serial matrix multiplier.

FIG. 6 is a table of control signal values for the FIG. 2 chain-serial matrix multiplier, used during each cycle of continuing operation after the cycle of initializing operation.

FIG. 7 is a table of third memory contents for the FIG. 2 chain-serial matrix multiplier.

FIG. 12 is a table of control signal values for the FIG. 11 chain-serial matrix multiplier.

FIG. 13 comprising FIGS. 13a, 13b, 13c and 13d is a table of the contents of storage elements in first and third memories of the FIG. 11 chain-serial matrix multiplier during an initial cycle and a continuing cycle of operation.

FIG. 14 is a table of the contents of other storage elements of the FIG. 11 matrix multiplier (including those in its second memory) during a portion of successive cycles of operation.

DETAILED DESCRIPTION

Figure 1:
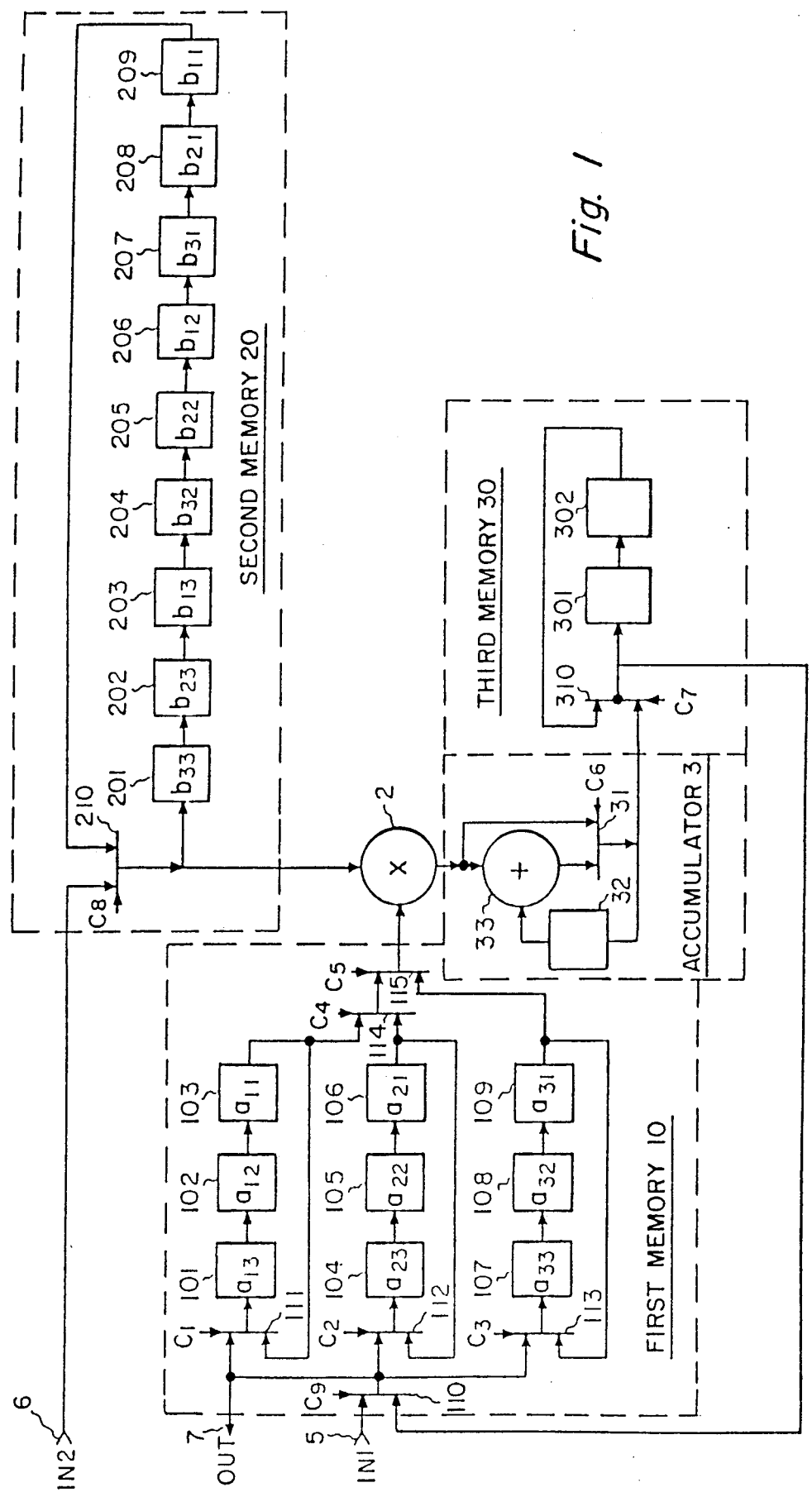
FIG. 1 is a schematic diagram of a chain-serial matrix multiplier embodying the invention, for performing the first form of chain-serial matrix multiplication described above.
Figure 8:
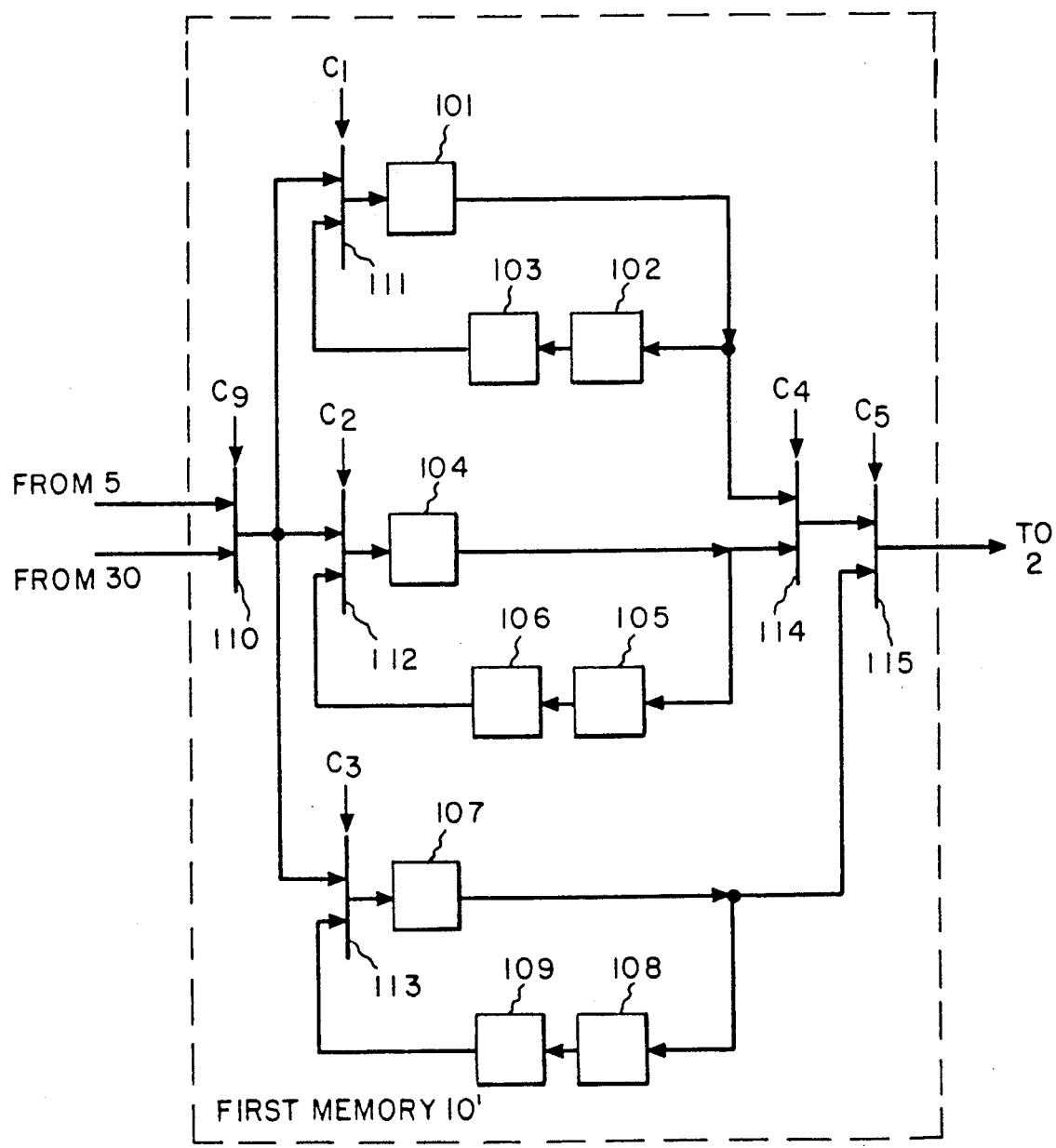
FIG. 8 is a schematic diagram of a modification that can be made to the FIG. 1 chain-serial matrix multiplier, to accommodate pipeline delays in multiplier.
Figure 9:
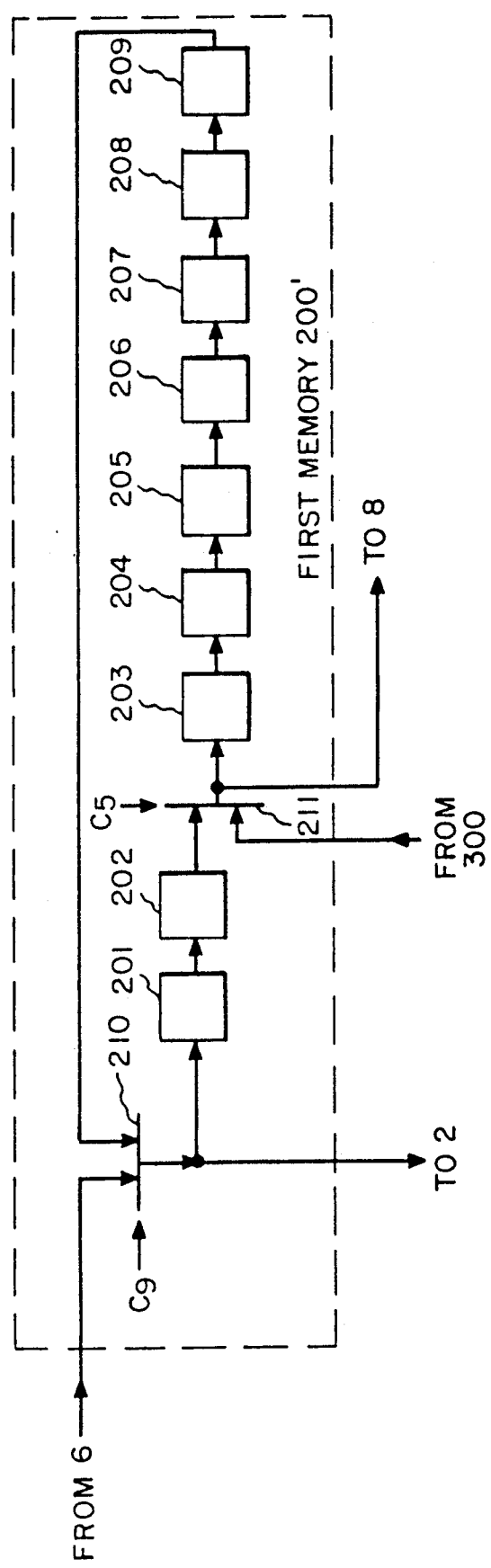
FIG. 9 is a schematic diagram of a modification that can be made to the FIG. 2 chain-serial matrix multiplier, to accommodate pipeline delays in the multiplier.

In FIG. 1 (as in FIGS. 2, 8, 9 and 11 to follow) each square box in the schematic diagram represents a temporary storage element providing one sample duration delay in serial memory or in a shift register. That is, these temporary storage elements are one-sample-delay elements. Conceptually, in regard to pipeline operation, during each sample period every signal sample propagates from one such temporary storage element to at least one succeeding such temporary storage element, participating in all operations therebetween. The terms "sample duration", "sample period", "sample interval", "word interval" and "step of the operating cycle" are essentially synonymous in this specification. The values within certain of the boxes representative of temporary storage elements are indicative of the matrix elements respectively stored therein at the outset of each cycle of continuing operation. Each multiplexer in the diagram is represented by a straight line transverse to the direction of signal flow, with input signals flowing to its two input connections as indicated by arrows and a single selected output signal flowing from an output connection as selected by a control signal C with a numerical subscript. When the control signal (shown applied via an arrow), is high or at logic ONE , the input connection closer to the control signal arrow is selected to the output connection. When the control signal is low or logic ZERO, the input connection further away is selected to the output connection. The clock condition shown for a time interval is presumed to arise in the portion of that times interval in which transfer of data to positions associated with that time interval have been completed, and that clock condition is presumed to continue until after transfers of data from those positions associated with that time interval have been completed. Where there is delay associated with a processing element between the output port of one temporary storage element and the input port of a succeeding temporary storage element, the clocking signal controlling the succeeding temporary storage element is correspondingly delayed. A circular element where the circle encloses a times sign is a multiplier, and a circular element where the circle encloses a plus sign is an adder. The adder is presumed to have negligible sample delay. In the chain-serial matrix multipliers shown in FIGS. 1 and 2 a multiplier 2 therein is presumed to have negligible delay as well; and FIGS. 8 and 9 show modifications to accommodate a two-word delay an actual multiplier may have in delivering its major product output.

The FIG. 1 chain-serial matrix multiplier will update a three-row-by-three column matrix ($a_{ij}$) by successive matrices multiplying that matrix, as originally provided, and as subsequently updated by a succession of three-row-by-three column matrices, or ($b_{ij}$)'s That is, the FIG. 1 structure is particularly suited to performing chain-serial matrix multiplication of the first form. A first memory 10 temporarily stores the original third-order matrix and thereafter stores the updated third-order matrix—i.e., the matrices used as multiplicands in the successive matrix multiplications. A second memory 20 temporarily stores the third order matrices used as multipliers in the successive matrix multiplications. The first memory 10 and second memory 20 are read in synchronism to provide pairs of matrix elements to multiplier 2, to be multiplied together to generate products. The matrix in said memory 10 is scanned in row major order during this synchronous reading of memories 10 and 20, with each successive row of elements being scanned n-fold times in reading from memory 10. The matrix in said second memory 20 is scanned in column major order, which scanning is done n-fold times during the synchronous reading of memories 10 and 20. Groups of three successive products are accumulated by an accumulator 3 to generate respective elements of an updated matrix. To avoid premature overwriting of the first memory 10, while at the same time implementing a pipelined continuing operation of the FIG. 1 chain-serial matrix multiplier, a third memory 30 is used to temporarily store elements of the updated matrix as generated by accumulator 3 until they can be written to first memory 10 without overwriting matrix elements that will be subsequently needed at multiplier 2.

A multiplexer 110 within first memory 10 responds to a control signal C9 being high (i.e., a ONE) which occurs only during an initializing operation, to select an input signal IN1 applied to the input port 5 of the FIG. 1 chain-serial matrix multiplier to write the initial third-order matrix into first memory 10. It is convenient to write this initial third-order matrix, used as multiplicand to first memory 10 in row major order, because memory 10 is organized for storage of each row of a third-order matrix in a respective serial memory. This is done so each row of the matrix can be cyclically read three times during the matrix multiplication procedure.

FIG. 3 table of control signals lists the nine successive steps for this operation of initially writing temporary storage elements 101–109 in memory 10 when the original third-order matrix is supplied memory 10 in row-by-row order. (The FIG. 3 table of control signals during initialization will also be referred to in regard to the FIG. 2 chain-serial matrix multiplier, and the control signal $C_5$ going high during initialization is immaterial inasfar as the FIG. 1 chain-serial matrix multiplier is concerned. One skilled in the art will perceive that any of a number of various initializing operations can be followed to initially load first memory in either the FIG. 1 or FIG. 2 matrix multiplier.) The structure and organization of first memory 10 will now be described in greater detail, and the FIG. 3 table should be considered together with this further description of memory 10.

Cascaded storage elements 101, 102 and 103 in memory 10 store the matrix elements in the first row and in the third, second and first columns, respectively. A multiplexer 111 in memory 10 responds to a control signal $C_1$ being high to selectively connect the output port of multiplexer 110 to the cascade connection of storage elements 101, 102 and 103 when the first row of a matrix is being written to memory 10—as, for example, during steps 1-3 of the initial writing operation. At other times $C_1$ is low, causing multiplexer 111 to select the output signal from the cascade connection of storage elements 101, 102 and 103 as input signal to that cascade connection. This implements circulating the data describing the first row of the third order matrix just written and provides serial memory operation.

Cascaded storage elements 104, 105 and 106 in memory 10 store the matrix elements in the second row and in the third, second and first columns, respectively. A multiplexer 112 in memory 10 responds to a control signal $C_2$ being high to selectively connect the output port of multiplexer 110 to the cascade connection of storage elements 104, 105 and 106 when the second row of a matrix is being written to memory 112—as, for example, during steps 4-6 of the initial writing operation. At other times $C_2$ is low, causing multiplexer 10 to select the output signal from the cascade connection of storage elements 104, 105 and 106 as input signal to that cascade connection. This implements circulating the data describing the second row of the third-order matrix just written and provides serial memory operation.

Cascaded storage elements 107, 108 and 109 in memory 10 store the matrix elements in the third row and in the third, second and first columns, respectively. A multiplexer 113 in memory 10 responds to a control signal $C_3$ being high to selectively connect the output port of multiplier 110 to the cascade connection of storage elements 107, 108 and 109 when the third row of a matrix is being written to memory 10—as, for example, during steps 7-9 of the initial writing operation. At other times $C_3$ is low, causing multiplexer 113 to select the output signal from the cascade connection of storage elements 107, 108 and 109 as input signal to that cascade connection. This implements circulating the data describing the third row of the third-order matrix just written and provides serial memory operation.

FIG. 4 is a table of control signals for cyclically continuing operation that commences when the initializing operation that writes the original third-order matrix into memory 10 concludes. Each cycle of continuing operation includes twenty-seven successive steps. Each step is concluded after the number of clock intervals associated with one data word, or sample, in the digital format being used. During the first nine steps of each cycle a third-order matrix is supplied in column major order as an input signal IN2 at an input port 6 of the FIG. 1 matrix multiplier. A multiplexer 210 in second memory 20 responds to its control signal $C_8$ being high to apply the successive samples of the input signal IN2 to the cascaded storage elements 201-209 in memory 20 and as multiplier signal to multiplier 2. At the same time elements of this multiplier matrix are being supplied column by column to multiplier 2, elements of the first row of the multiplicand matrix temporarily stored in first memory 10 are read three times from that memory as multiplicand signal. During steps 1-9 of the continuing operation cycle control signals $C_4$ and $C_5$ are both high, conditioning multiplexers 114 and 115 in memory 10 for selecting the first row of $(a_{ij})$ three successive times as multiplicand signal to multiplier 2.

During steps 1-9 of the continuing operation the successive samples of IN2 input signal describing, column by column, the matrix used as multiplier in the matrix multiplication are stored in the successive storage elements 201-209 of second memory 20 to be recycled to multiplier 2 during steps 10-18 and during steps 19-27 of the cycle of continuing operation. To implement this recycling of the multiplier matrix elements, during steps 10-27 of continuing operation control signal $C_8$ is low, conditioning multiplexer 210 to supply multiplier 2 multiplier signal input port and storage element 201 input port from the output port of storage element 209. During steps 10-18 of the continuing operation cycle, control signal $C_4$ is low and control signal $C_5$ is high, conditioning multiplexers 114 and 115 in first memory 10 for selecting the second row of $(a_{ij})$ three successive times as multiplicand signal to multiplier 2. During steps 18-27 of the continuing operation cycle, control signal $C_5$ is low, conditioning multiplexer 115 for selecting the third row of $(a_{ij})$ three successive times as multiplicand to multiplier 2. The condition of control signal $C_4$ is not of concern during steps 19-27, and the "don't care" condition is indicated by x entries in the FIG. 4 table. Thus, the control signal $C_4$ can be provided by control signal $C_8$.

Multiplier 2 generates the products of elements in each $(a_{ij})$ row times each $(b_{ij})$ column, which products are accumulated by accumulator 3 to generate a respective element of the new $(c_{ij})$ matrix to be temporarily stored in third memory 30. Towards this goal, Control signal $C_6$ is high every third step of the cycle beginning with the first, to condition a multiplexer 31 in accumulator 3 to select a first of the products from multiplier 2 to be accumulated for application to a temporary storage element 32 in accumulator 3. During the next step of the cycle $C_6$ is low, to condition multiplexer 31 to select to temporary storage element 32 the sum output of an adder 33 in accumulator 3, which adder now adds the previous content of temporary storage element 32 to a second of the products of multiplier 2 to be accumulated. During the next step of the cycle control signal $C_6$ remains low, to condition multiplexer 31 to select the sum output of adder 33, which adder now adds the previous content of temporary storage element 32 (the sum of the first two products from multiplier 2 to be accumulated) to a third of the products of multiplier 2 to be accumulated. Adder 33 sum output is not only selected to temporary storage element 32 (to be discarded in adder 33 the next step of the continuing operating cycle) but also to third memory 30, as accumulator 3 output signal.

Third memory 30 has a multiplexer 310 at its input port that is conditioned by a control signal $C_7$ going high only every third step of the continuing operating cycle beginning with the third to admit accumulator 3 output signal to the cascade connection of temporary storage elements 301 and 302 in memory 30. Third memory 30 is a serial memory that not only provides temporary storage for the newly generated $(c_{ij})$ matrix elements before their being written into first memory

10, but also provides temporal compression, each row of three elements of the newly generated ($c_{ij}$) matrix are made available for being written into first memory 10 in three successive steps of the continuing operating cycle.

FIG. 5 is a table showing the respective contents of temporary storage elements 301 and 302 in third memory 30 during each of the twenty-seven steps of a cycle continuing operation and for five steps of the next cycle of continuing operation. The entries "OLD" refer to the contents of temporary storage elements 301 and 302 having been stored prior to the generation of the ($c_{ij}$) matrix, and the entries "NEW" refer to the contents of temporary storage elements 301 and 302 being generated as elements of the matrix succeeding ($c_{ij}$). Reference will be made to portions of this table further along in this specification to show the temporal compression of each successively generated row of the ($c_{ij}$) matrix by third memory 30 when that row is read from the output port of third memory 30 to write first memory 10.

During steps 1-3 the first row of ($a_{ij}$) is multiplied by the first column of ($b_{ij}$) to generate three successive products at the output port of multiplier 2, for application to the input port of accumulator 3, to be accumulated to generate $c_{11}$. Between steps 3 and 4 accumulator 3 output sample $c_{11}$ is admitted to the cascade connection of storage elements 301 and 302 in third memory 30. During steps 4-6 the first row of ($a_{ij}$) is multiplied by the second column of ($b_{ij}$) to generate three successive products at the output port of multiplier 2, for application to the input port of accumulator 3 to be accumulated to generate $c_{12}$. Between steps 6 and 7 accumulator 3 output sample $c_{12}$ is admitted to the cascade connection of storage elements 301 and 302 in third memory 30. During steps 7-9 the first row of ($a_{ij}$) is multiplied by the third column of ($b_{ij}$) to generate three successive products at the output port of multiplier 2, for application to the input port of accumulator 3, to be accumulated to generate $c_{13}$. Between steps 9 and 10 accumulator 3 output sample $c_{13}$ is admitted to the cascade connection of storage elements 301 and 302 in third memory 30.

Referring to the FIG. 5 table, one can determine that the contents of temporary storage element 301 during steps 8-10 of continuing operation are matrix elements $c_{11}$, $c_{12}$ and $c_{13}$, respectively. Control signal $C_9$ is low and control signal $C_1$ is high during steps 7-9, as can be noted from FIG. 4 table, so matrix elements $c_{11}$, $c_{12}$ and $c_{13}$ pass through multiplexers 110 and 111 to clock into the cascade connection of temporary storage elements 101, 102 and 103, filling in behind the previous matrix elements $a_{11}$, $a_{12}$ and $a_{13}$ as they are clocked out of this cascade connection. During step 10 matrix elements $c_{13}$, $c_{12}$ and $c_{11}$ repose respectively in temporary storage elements 101, 102 and 103.

During steps 10-12 the second row of ($a_{ij}$) is multiplied by the first column of ($b_{ij}$) to generate three successive products at the output port of multiplier 2, for application to the input port of accumulator 3, to be accumulated to generate $c_{21}$. Between steps 12 and 13 accumulator 3, output sample $c_{21}$ is admitted to the cascade connection of storage elements 301 and 302 in third memory 30. During steps 13-15 the second row of ($a_{ij}$) is multiplied by the second column of ($b_{ij}$) to generate three successive products at the output port of multiplier 2, for application to the input port of accumulator 3 to be accumulated to generate $c_{22}$. Between steps 15 and 16 accumulator 3 output sample $c_{22}$ is admitted to the cascade connection of storage elements 301 and 302 in third memory 30. During steps 16-18 the second row of ($a_{ij}$) is multiplied by the third column of ($b_{ij}$) to generate three successive products at the output port of multiplier 2, for application to the input port of accumulator 3 to be accumulated to generate $c_{23}$. Between steps 18 and 19 accumulator 3 output sample $c_{23}$ is admitted to the cascade connection of storage elements 301 and 302 in third memory 30.

Referring again to the FIG. 5 table, one can determine that the contents of temporary storage element 301 during steps 17-19 of continuing operation are matrix elements $c_{21}$, $c_{22}$ and $c_{23}$, respectively. Control signal $C_9$ is low and control signal $C_2$ is high during steps 16-18, as can be noted from FIG. 4 table, so matrix elements $c_{21}$, $c_{22}$ and $c_{23}$ pass through multiplexers 110 and 112 to clock into the cascade connection of temporary storage elements 104, 105 and 106, filling in behind the previous matrix elements $a_{21}$, $a_{22}$ and $a_{23}$ as they are clocked out of this cascade connection. During step 19 matrix elements $c_{23}$, $c_{22}$ and $c_{21}$ repose respectively in temporary storage elements 104, 105 and 106.

During steps 19-21 the third row of ($a_{ij}$) is multiplied by the first column of ($b_{ij}$) to generate three successive products at the output port of multiplier 2, for application to the input port of accumulator 3, to be accumulated to generate $c_{31}$. Between steps 21 and 22 accumulator 3 output sample $c_{31}$ is admitted to the cascade connection of storage elements 301 and 302 in third memory 30. During steps 22-24 the third row of ($a_{ij}$) is multiplied by the second column of ($b_{ij}$) to generate three successive products at the output port of multiplier 2, for application to the input port of accumulator 3 to be accumulated to generate $c_{32}$. Between steps 24 and 25 accumulator 3, output sample $c_{32}$ is admitted to the cascade connection of storage elements 301 and 302 in third memory 30. During steps 25-27 the third row of ($a_{ij}$) is multiplied by the third column of ($b_{ij}$) to generate three successive products at the output port of multiplier 2, for application to the input port of accumulator 3 to be accumulated to generate $c_{33}$. Between step 27 and step 1 of the following cycle of operation accumulator 3 output sample $c_{33}$ is admitted to the cascade connection of storage elements 301 and 302 in third memory 30.

Referring still again to the FIG. 5 table, one can determine that the contents clocked into temporary storage element 301 during steps 26-27 and 1 of continuing operation are matrix elements $c_{31}$, $c_{32}$ and $c_{33}$, respectively. Control signal $C_9$ is low and control signal $C_3$ is high during steps 25-27 as can be noted from FIG. 4 table, so matrix elements $c_{31}$, $c_{32}$ and $c_{33}$ pass through multiplexers 110 and 112 to clock into the cascade connection of temporary storage elements 107, 108 and 109, filling in behind the previous matrix elements $a_{31}$, $a_{32}$ and $a_{33}$ as they are clocked out of this cascade connection. In step 1 of the new cycle matrix elements $c_{33}$, $c_{32}$ and $c_{31}$ repose respectively in temporary storage elements 107, 108 and 109.

Consider again, in particular, the operation of the serial third memory 30 in steps 7-9, 16-18 and 25-27 of the cycle of continuing operation. The multiplexer 310 supplies at its output port to temporary storage element 301 and to first memory 10 the rows of ($c_{ij}$) matrix in time-compressed form, without intervening samples between the elements of each row of the matrix. Accordingly, the ($c_{ij}$) matrix is available in row major form at an output terminal 7 connected from the output port of multiplexer 110, elements of the first row being available following steps 7-9 respectively, elements of the second row being available following steps 16-18, respectively, and the elements of the third row being available following steps 25-27, respectively.

Figure 2:
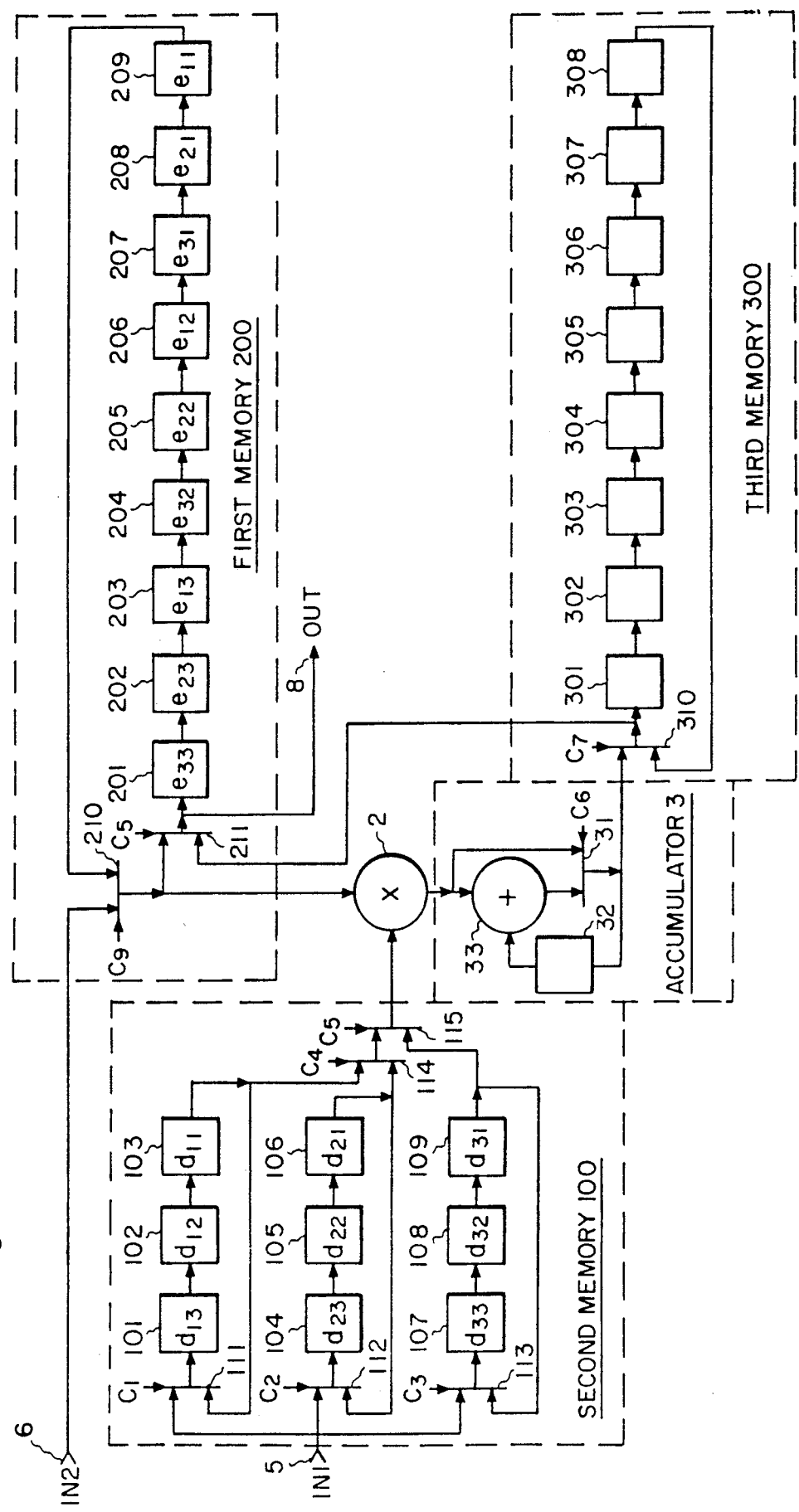
FIG. 2 is a schematic diagram of a chain-serial matrix multiplier embodying the invention, for performing the second form of chain-serial matrix multiplication described above.

The FIG. 2 chain-serial matrix multiplier will update a three-row-by-three column matrix ($e_{ij}$) by using respective ones of a first series of matrices comprising that matrix and the updated matrices to matrix multiply respective ones of a second series of three row by three column matrices or ($d_{ij}$)'s. That is, the FIG. 2 structure is particularly suited to performing chain-serial matrix multiplication of the second form.

FIG. 2 chain-serial matrix multiplier differs from that of FIG. 1 basically in three ways—namely, in that the updated matrices are fed back to first memory 200 after being transposed in a modified form 300 of third memory, in that memory 200 resembling second memory 20 of the FIG. 1 matrix multiplier serves as first memory in the FIG. 2 matrix multiplier, and in that memory 100 resembling first memory 10 of the FIG. 1 matrix multiplier serves as second memory in the FIG. 2 matrix multiplier. First memory 200 temporarily stores the original third-order matrix and thereafter stores the updated third-order matrix—i.e., the matrices used as multipliers in the successive matrix multiplications. Memory 200 differs structurally from memory 20 in that it includes an additional multiplexer 211, used for admitting updated matrices from the third memory 300. Second memory 100 temporarily stores the third order matrices used as multiplicands in the successive matrix multiplications. Memory 100 differs structurally from memory 10 in that multiplexer 110 is not used for admitting updated matrices into memory.

The first memory 200 and second memory 100 are read in synchronism to provide pairs of matrix elements to multiplier 2, to be multiplied together to generate products. The matrix in the memory 100 is scanned in row major order during this synchronous reading of memories 100 and 200, with each successive row of elements being scanned n-fold times in reading from memory 100. The matrix in the memory 200 is scanned in column major order, which scanning is done n-fold times during the synchronous reading of memories 100 and 200.

Groups of three successive products are accumulated by an accumulator 3 to generate respective elements of an updated matrix. To avoid premature overwriting of the first memory 200, while at the same time implementing a pipelined continuing operation of the FIG. 2 chain-serial matrix multiplier, third memory 300 is used to temporarily store elements of the updated matrix as generated by accumulator 3 until they can be written to first memory 200 without overwriting matrix elements that will be subsequently needed at multiplier 2. This temporary storage is done such that while third memory 300 is written in row major order from accumulator 3, third memory 300 is subsequently read in column major order to first memory 200 via multiplexer 211 therein.

The FIG. 3 table of control signals describes a nine-step initializing operation that is also suitable for the FIG. 2 as well as FIG. 1 chain-serial matrix multiplier. Input signal IN1 supplied via input terminal 5 to the input port of second memory 100 provides the original third-order multiplicand matrix in row major order, each row being stored in a respective serial memory so each row of the matrix can be cyclically read three times during the matrix multiplication in the first cycle of continuing operation, just as in the FIG. 1 apparatus. Input signal IN2 supplied via input terminal 6 to the input port of first memory 200 provides the first third-order multiplier matrix in column major order to be stored in that serial memory until read in column major order three times in the first cycle of continuing operation.

FIG. 6 is a table of control signals for cyclically continuing operation that commences when the initializing operation concludes. Each cycle of continuing operation includes twenty-seven successive steps. Each step takes the number of clock intervals associated with one data word, or sample, in the digital format being used. Control signals $C_4$, $C_5$, $C_6$, $C_7$ and $C_9$ are the same during the cycle of continuing operation as they were in the cycle of continuing operation for the FIG. 1 matrix multiplier as tabulated in FIG. 4. Control signals $C_1$, $C_2$, and $C_3$ could also be the same for both the FIG. 1 and FIG. 2 matrix multipliers. However, since these control signals do not have to facilitate loading of second memory 100 from third memory 300, there are many ways to load memory 100 row by row. The $C_1$, $C_2$ and $C_3$ control signals shown in the FIG. 6 table facilitate the circuitry for supplying these signals to operate on a regular cycle during both initializing and continuing operation. During the last nine steps of each cycle of continuing operation, second memory 100 is loaded with the new multiplicand for the next cycle of continuing operation, this matrix being supplied in row major order via terminal 5. A control signal $C_8$ is not used in the FIG. 2 matrix multiplier.

The most important difference in continuing operation of the FIG. 2 matrix multiplier, as compared to that of FIG. 1, concerns the loading of first memory 200 with an updated multiplier matrix from third memory 300 during the last nine steps of the cycle of continuing operation. During the last nine 19-27 of each succeeding cycle of continuing operation control signal $C_5$ is low, conditioning multiplexer 211 in first memory 200 to accept as the input signal for memory 200 an output signal from third memory 300, as supplied from the output port of multiplexer 310 in memory 300. As will be explained in greater detail further on, during the first nine steps of each cycle of continuing operation, multiplexer 210 in first memory 200 selects for application as multiplier signal to multiplier 2 the successive samples of this updated matrix as shifted out of the cascaded storage elements 200-209 in memory 200. At the same time elements of this multiplier matrix are being supplied column by column from first memory 200 to multiplier 2, elements in the first row of the multiplicand matrix temporarily stored in second memory 100 are read three times from that memory as multiplicand signal.

Multiplier 2 generates the products of elements in each ($d_{ij}$) row times each ($e_{ij}$) column, which are accumulated by accumulator 3 to generate a respective element of the new ($f_{ij}$) matrix to be temporarily stored in third memory 300. Towards this goal, control signal $C_6$ is high every third step of the cycle beginning with the first, to condition multiplexer 31 in accumulator 3 to select a first of the products from multiplier 2 to be accumulated for application to temporary storage element 32 in accumulator 3. During the next step of the cycle $C_6$ is low, to condition multiplexer 31 to select to temporary storage element 32 the sum output of adder 33 in accumulator 3, which adder now adds the previous content of temporary storage element 32 to a second of the products of multiplier 2 to be accumulated. During the next step of the cycle control signal $C_6$ remains low, to condition multiplexer 31 to select the sum output of adder 33, which adder now adds the previous content of temporary storage element 32 (the sum of the first two products from multiplier 2 to be accumulated) to a third of the products of multiplier 2 to be accumulated. Adder 33 sum output is not only selected to temporary storage element 3 (to be discarded in adder 32 the next step of the continuing operating cycle) but also to third memory 300, as accumulator 3 output signal.

Third memory 300 has a multiplexer 310 at its input port that is conditioned by a control signal $C_7$ going high only every third step of the continuing operating cycle beginning with the third, to admit accumulator 3 output signal to the cascade connection of temporary storage elements 301-308 in memory 300. Third memory 300 is a serial memory that not only provides temporary storage for the newly generated $(f_{ij})$ matrix elements before their being written into first memory 200, but also transposes the newly generated $(f_{ij})$ matrix as written into first memory 200 in the last nine successive steps of the continuing operating cycle.

FIG. 7 is a table showing the respective contents of temporary storage elements 301-308 in third memory 300 during each of the twenty-seven steps of continuing operation. Reference will be made to portions of this table further along in this specification to show the transposition of the $(f_{ij})$ matrix by third memory 300 when that matrix is read from the output port of third memory 300 to write first memory 200.

During steps 1-9 of the continuing operation cycle control signals $C_4$ and $C_5$ are both high, conditioning multiplexers 114 and 115 in memory 100 for selecting the first row of $(d_{ij})$ three successive times as multiplicand signal to multiplier 2. During steps 1-3 the first row of $(d_{ij})$ is multiplied by the first column of $(e_{ij})$ to generate three successive products at the output port of multiplier 2, for application to the input port of accumulator 3 to be accumulated to generate $f_{11}$. Between steps 3 and 4 accumulator 3 output sample $f_{11}$ is admitted to the cascade connection of storage elements 301-308 in third memory 300. During steps 4-6 the first row of $(d_{ij})$ is multiplied by the second column of $(e_{ij})$ to generate three successive products at the output port of multiplier 2, for application to the input port of accumulator 3 to be accumulated to generate $f_{12}$. Between steps 6 and 7 accumulator 3 output sample $f_{12}$ is admitted to the cascade connection of storage elements 301-308 in third memory 300. During steps 7-9 the first row of $(d_{ij})$ is multiplied by the third column of $(e_{ij})$ to generate three successive products at the output port of multiplier 2, for application to the input port of accumulator 3 to be accumulated to generate $f_{13}$. Between steps 9 and 10, accumulator 3 output sample, $f_{13}$ is admitted to the cascade connection of storage elements 301-308 in third memory 300.

During steps 10-18 of the continuing operation cycle control signal $C_4$ is low and control signal $C_5$ is high, conditioning multiplexers 114 and 115 in memory 100 for selecting the second row of $(d_{ij})$ three successive times as multiplicand signal to multiplier 2. During steps 10-12 the second row of $(d_{ij})$ is multiplied by the first column of $(e_{ij})$ to generate three successive products at the output port of multiplier 2, for application to the input port of accumulator 3 to be accumulated to generate $f_{21}$. Between steps 12 and 13, accumulator 3 output sample $f_{21}$ is admitted to the cascade connection of storage elements 301-308 in third memory 300. During steps 13-15 the second row of $(d_{ij})$ is multiplied by the second column of $(e_{ij})$ to generate three successive products at the output port of multiplier 2, for application to the input port of accumulator 3 to be accumulated to generate $f_{22}$. Between steps 15 and 16 accumulator 3 output sample $f_{22}$ is admitted to the cascade connection of storage element 301-308 in third memory 300. During steps 16-18 the second row of $(d_{ij})$ is multiplied by the third column of $(e_{ij})$ to generate three successive products at the output port of multiplier 2, for application to the input port of accumulator 3 to be accumulated to generate $f_{23}$. Between steps 18 and 19 accumulator 3 output sample $f_{23}$ is admitted to the cascade connection of storage elements 301-308 in third memory 300.

During steps 19-27 of the continuing operation cycle control signal $C_5$ is low, conditioning multiplexer 115 in memory 100 for selecting the third row of $(d_{ij})$ three successive times as multiplicand signal to multiplier 2. During steps 19-21 the third row of $(d_{ij})$ is multiplied by the first column of $(e_{ij})$ to generate three successive products at the output port of multiplier 2, for application to the input port of accumulator 3 to be accumulated to generate $f_{31}$. Between steps 21 and 22 accumulator 3 output sample $c_{31}$ is admitted to the cascade connection of storage elements 301-308 in third memory 300. During steps 22-24 the third row of $(d_{ij})$ is multiplied by the second column of $(e_{ij})$ to generate three successive products at the output port of multiplier 2, for application to the input port of accumulator 3 to be accumulated to generate $f_{32}$. Between steps 24 and 25 accumulator 3 output sample $f_{32}$ is admitted to the cascade connection of storage elements 301-308 in third memory 300. During steps 25-27 the third row of $(d_{ij})$ is multiplied by the third column of $(e_{ij})$ to generate three successive products at the output port of multiplier 2, for application to the input port of accumulator 3 to be accumulated to generate $f_{33}$. Between step 27 and step 1 of the next cycle accumulator 3 output sample $f_{33}$ is admitted to the cascade connection of storage elements 301-308 in third memory 300.

Referring to the FIG. 7 table, one can determine that the contents of temporary storage element 301 following steps 19-27 of continuing operation are matrix elements $f_{11}$, $f_{21}$, $f_{31}$, $f_{12}$, $f_{22}$, $f_{32}$, $f_{13}$, $f_{23}$ and $f_{33}$, respectively. This is a column major ordering of the elements in $(e_{ij})$ matrix, which is suitable for updating first memory 200 during these last nine steps of the continuing operation cycle. Control signal $C_5$ is low during steps 19-27 as can be noted from FIG. 6 table, so matrix elements $f_{11}$, $f_{21}$, $f_{31}$, $f_{12}$, $f_{22}$, $f_{32}$, $f_{13}$, $f_{23}$ and $f_{33}$ pass through multiplexers 211 to clock into the cascade connection of temporary storage elements 201-209 in first memory 200. Output signal is taken from the output port of multiplexer 211, which signal describes the updated matrix in column major order and flows to an output terminal 8 of the FIG. 2 matrix multiplier.

The digital calculations thusfar described can be carried out in a variety of digital processing formats. Bit-parallel processing, where all bits in a word descriptive of a matrix element occur simultaneously and the words occur in succession, is implemented in straightforward fashion, assuming system clock rate is chosen slow enough that multiplications in multiplier 2 generate a complete product within one clock time for a word. In the interest of faster operation, multiplier 2 is usually made so the minor product is within one clock time for a word and so the major product is generated within the next clock time for a word. (The major product consists of the more significant bits of a complete product and the minor product consists of the less significant bits of a complete product, the number of bits in a product being the sum of the number of bits in the multiplicand and the number of bits in the multiplier, if sign bits are not considered). If digit-serial data processing is pursued, the multiplier 2 if a pipeline type exhibits a two-word delay in providing the major product. The major product is the part of the complete product that is usually retained, while the minor product is usually discarded. This two-word delay in multiplier 2 has to be compensated for, if it exists.

FIG. 8 shows modifications of the first memory 10 in the FIG. 1 matrix multiplier, which are made to compensate for multiplier 2 therein exhibiting two-word delay in generating major product.

FIG. 9 shows a modification of the first memory 200 in the FIG. 2 matrix multiplier, which is made to compensate for multiplier 2 therein exhibiting a two-word delay in generating major product.

The chain-serial matrix multipliers of FIG. 1 can also be realized using bit-serial digital hardware. In such case, to first approximation, each sample element shown in a box in these figures is realized by a plurality of single clock interval delay elements equal to the number of bits per sample word. Adders and multiplexers have a single-bit throughput delay, which is compensated for by adjustments in the number of single-clock-interval delay elements in the delay lines. A bit-serial pipeline multiplier 2 is likely to have a two-word plus one bit delay therethrough and compensatory adjustment is made again by adjusting the number of single-clock-interval delay elements in the delay lines. Bit-serial digital hardware is oftentimes laid out with the assistance of a silicon compiler, and the silicon compiler can with delay equations written in accordance with FIG. 1 or FIG. 2 automatically make the delay adjustments necessary to lay out such a matrix multiplier on the integrated circuit die.

Modifications of chain-serial matrix multipliers of the type shown in FIG. 1 which use three multipliers with a respective accumulator and third memory for each can provide faster operation where needed. The second memory is scanned one time, rather than three times; and the serial memories in first memory 10 are thricefold read in parallel, rather than one after the other.

While chain-serial matrix multipliers for multiplying third-order matrices are specifically described in this specification, extensions of the invention for multiplying other-order matrices should be obvious to one skilled in the art and acquainted with this specification. The control signals for all such chain-serial matrix multipliers are readily generated by using binary circuits to count in digits of a radix that is the same as the order of the matrices being multiplied.

Chain-serial matrix multiplication is, for example, of interest in airborne detection systems that provide continually sampled sensor data and that are mounted in fixed position (hard-mounted) on the hull of the host aircraft. To facilitate relating the data from detections made at different times it is necessary to convert all detected data to a common system of spatial coordinates in which aircraft motion between successive sampling times is compensated for.

The conventional method used to stabilize detections is to mount the sensor on a stabilized platform. The platform is gimbaled to permit rotations around pitch, yaw and roll axes; and the position of the platform is sensed by three gyros. The outputs of the gyros are proportional to the angles (or rates) through which the gimbals have moved. These gyro angles represent order-dependent rotations about each of the gimbal axes. In other words, these angles represent a rotation about the yaw axis, followed by a rotation about the pitch axis, followed by a rotation around the roll axis. These are the Euler angles of rotation, which can be used to form the Euler transformation matrices.

In the right-hand coordinate system, the Euler transformation matrix $[E_\alpha]$ for a rotation through an angle $\alpha$ about the z-axis is as follows:

$$[E_\alpha] = \begin{bmatrix} \cos \alpha & -\sin \alpha & 0 \\ \sin \alpha & \cos \alpha & 0 \\ 0 & 0 & 1 \end{bmatrix} \tag{5}$$

The Euler transformation matrix $[E_\beta]$ for a rotation through an angle $\beta$ about the y axis is as follows:

$$[E_\beta] = \begin{bmatrix} \cos b & 0 & \sin b \\ 0 & 1 & 0 \\ -\sin b & 0 & \cos b \end{bmatrix} \tag{6}$$

And, the Euler transformation $[E_\gamma]$ matrix for a rotation through an angle $\gamma$ about the x-axis is as follows:

$$[E_\gamma] = \begin{bmatrix} 1 & 0 & 0 \\ 0 & \cos \gamma & -\sin \gamma \\ 0 & \sin \gamma & \cos \gamma \end{bmatrix} \tag{7}$$

If the order of rotation were $\alpha$, $\beta$, and then $\gamma$, the total transformation in three dimensions would be the product of these three matrices. The order of this multiplication must be preserved.

$$[E_\alpha][E_\beta][E_\gamma] = \tag{8}$$

$$\begin{bmatrix} (\cos \alpha \cos \beta) & (\cos \alpha \sin \beta \sin \gamma - \sin \alpha \cos \gamma) & (\cos \alpha \sin \beta \cos \gamma + \sin \alpha \sin g) \\ (\sin \alpha \cos \beta) & (\sin \alpha \sin \beta \sin \gamma + \cos \alpha \cos \gamma) & (\sin \alpha \sin \beta \cos \gamma - \cos \alpha \sin \gamma) \\ -\sin \beta & (\cos \beta \sin \gamma) & (\cos \beta \cos \gamma) \end{bmatrix}$$

Once the angles of rotation between two coordinate systems are known, the transformation of a point in one coordinate system to the other is performed by matrix multiplication. Given two coordinates systems A and B, and knowing the Euler angles from A to B, the transformation of a point x', y', z' in B's frame back to point x, y, z in A's frame is as follows:

$$[E_{AB}] \cdot \begin{bmatrix} x' \\ y' \\ z' \end{bmatrix} = \begin{bmatrix} x \\ y \\ z \end{bmatrix} \quad (9)$$

If there were three coordinate systems, A, B and C, and the Euler transformation matrix $[E_{AB}]$ from A to B and the Euler transformation matrix $[E_{BC}]$ from B to C are known, then it is possible to find the Euler transformation matrix $[E_{AC}]$ from A to C is as follows:

$$[E_{AC}] = [E_{AB}] \cdot [E_{BC}] \quad (10)$$

This method is used to update the transformation matrix from the sensor coordinate frame to the inertial coordinate system. Euler matrix $[E_{AB}]$ would be the previous transformation, and the Euler matrix $[E_{BC}]$ would be the incremental transformation. The current transformation $\{E_{AC}\}$ would just be the multiplication of the two matrices per equation (10). Over the course of time continual updating of the Euler transformation matrix can be obtained by chain serial multiplication by a succession of incremental transformation matrices.

For practical reasons detection systems often need to be hard-mounted to aircraft hulls as opposed to being mounted on stabilized platforms. Sensor data therefore includes the effects of any aircraft motion. To reduce the system false alarm rate to an acceptable level, potential threats must be tracked in an inertial coordinate system. Effects of aircraft motion must therefore be eliminated from the raw sensor data before tracking can be done. Three rate-integrating gyros located at the sensor and strapped down to the aircraft hull will be able to measure motion caused by aircraft maneuvers as well as motion caused by aircraft vibrations, flexure and turbulence.

Since the angles measured by the strapped down gyros are not the Eulerian angles of rotation, the associated Euler matrix cannot be used. A first-order differential equation must be solved to find the transformation matrix T, which is, $$\dot{T}(t) = T(t)W(t) \quad (11)$$

The transformation matrix T, is a function of time as well as the coefficient matrix W. The coefficient matrix W is given by, $$W(t) = \begin{bmatrix} 0 & -W_\alpha & W_\beta \\ W_\alpha & 0 & -W_\gamma \\ -W_\beta & W_\gamma & 0 \end{bmatrix} \quad (12)$$

The elements of the W matrix are the rate measured by the three gyros.

The solution to the differential equation (11) is $$T(t) = T(t_0)\Phi(t,t_0) \quad (13)$$

where $\Phi(t,t_0)$ is the transition matrix associated with the equation. (Refer to R. W. Brockett, *Finite Dimensional Linear Systems*, John Wiley & Sons, N.Y., 1970, pp. 19–23).

If $\tau = t - t_0$ is small, i.e., $|\tau| << 1$, then $\Phi(t,t_0)$ may be expressed as follows:

$$\Phi(t,t_0) \cong I + W(t)\tau = \begin{bmatrix} 1 & 0 & 0 \\ 0 & 1 & 0 \\ 0 & 0 & 1 \end{bmatrix} + \begin{bmatrix} 0 & -W_\alpha\tau & W_\beta\tau \\ W_\alpha\tau & 0 & -W_\gamma\tau \\ -W_\beta\tau & W_\gamma\tau & 0 \end{bmatrix} = \begin{bmatrix} 1 & -\alpha & \beta \\ \alpha & 1 & -\gamma \\ -\beta & \gamma & 1 \end{bmatrix} \quad (14)$$

where I is the unit matrix and $\alpha,\beta,\gamma$ are the angles each gyro rotates through during the time $\tau$. Therefore, to update a transformation $T(t_1)$ to $T(t_2)$ where $t_2 - t_1 = \tau$, the following matrix multiplication is performed $$T(t_2) = T(t_1) T \quad (15)$$

where the incremental transformation matrix T is given by $$T = \begin{bmatrix} 1 & -\alpha & \beta \\ \alpha & 1 & -\gamma \\ -\beta & \gamma & 1 \end{bmatrix} \quad (16)$$

Figure 10:
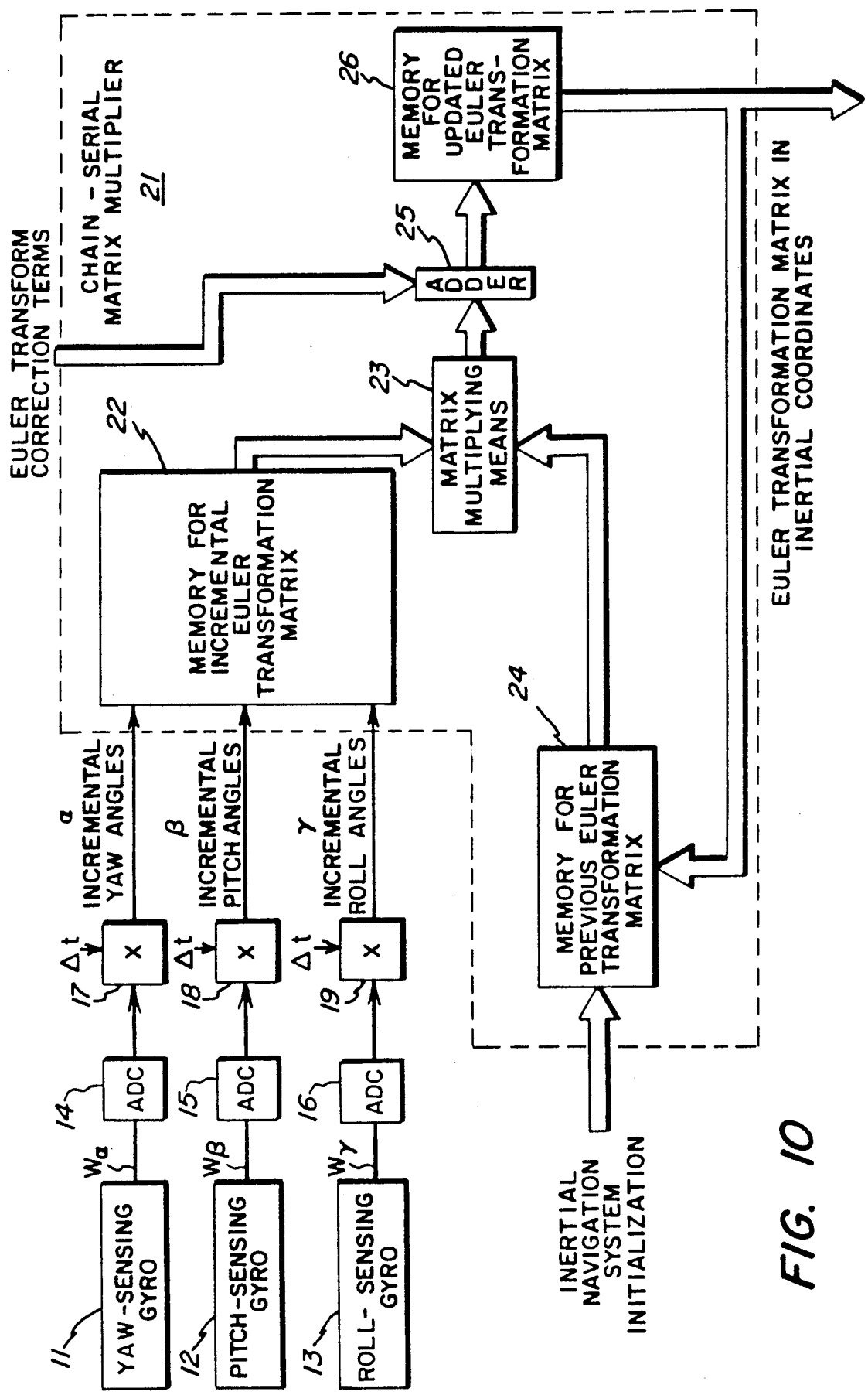
FIG. 10 is a schematic diagram of a system for calculating Euler transformation matrices for converting sensor data to an inertial coordinate system.

FIG. 10 is a conceptual schematic diagram of the inertial transformation matrix generation (TMG) system for generating Euler transformation matrices that are used for transforming the aircraft sensor data to an inertial coordinate system in which the effects of aircraft motion are suppressed. A yaw-sensing gyro 11 generates rate of yaw angle change information $W_\alpha$ in analog form, which is converted to digital form by an analog-to-digital converter 14 and is then supplied to a digital multiplier 17, there to be multiplied by an increment of time $\Delta t$ to generate a stream of $\alpha$ incremental roll angles. A pitch-sensing gyro 12 generates rate of pitch angle change information $W_\beta$ in analog form which is converted to digital form by an analog-to-digital converter 15 and is then supplied to a digital multiplier 18, there to be multiplied by $\Delta t$ to generate a stream of $\beta$ incremental pitch angles. A roll-sensing gyro 13 generates rate of roll $W_\gamma$ in analog form, which is converted to digital form by an analog-to-digital converter 16 and then is supplied to a digital multiplier 19, there to be multiplied by $\Delta t$ to generate a stream of $\gamma$ incremental roll angles. The $\alpha$, $\beta$ and $\gamma$ incremental angles are used to define the incremental Euler transformation matrix T of matrix equation (16), and a chain-serial matrix multiplier 21 uses a succession of these matrices to generate a succession of updated Euler transformation matrices per matrix equation (15).

Chain-serial matrix multiplier 21 includes elements 22–26. Memory 22 stores incremental Euler transformation matrices and is written in accordance with the $\alpha$, $\beta$ and $\gamma$ incremental Euler angles generated at the output ports of digital multipliers 17, 18 and 19. The previous Euler transformation matrix as read from memory 24 is multiplied in matrix multiplying means 23 by each successive one of these matrices to generate an updated Euler transformation matrix which is periodically corrected by adding correction terms in adder 25. The corrected updated Euler transformation matrix is temporarily stored in a memory 26 and is subsequently used for writing over memory 24. The initial Euler transformation matrix in memory 24 is supplied from the inertial navigation system.

Euler transformation matrix correction terms are periodically introduced using an adder 25, located after matrix multiplying means 23, since the correction loop is then inclusive of the sources of these previously uncorrected for errors. The Euler transformation correction terms supplied to adder 25 are an error signal matrix generated by comparing the Euler transform, as integrated over time to suppress higher-frequency terms arising from vibration and airframe flexure, and the inertial navigation system (INS) transform. Comparison is accomplished by matrix subtraction. The integrated Euler transform from the inertial transformation matrix generation (TMG) system is primarily responsive to low-frequency motion of the aircraft, just as the INS transform is.

The TMG system is more particularly described by Stephen J. Rapiejko, Nancy Clark and the present inventors in their concurrently filed patent application entitled "INERTIAL TRANSFORMATION MATRIX GENERATOR" and assigned to General Electric Company.

The FIG. 1 or FIG. 2 chain-serial matrix multipliers operated to perform chain-serial matrix multiplications of the first form can be used as chain-serial matrix multiplier 21. However, rather than using such a general-purpose third-order matrix multiplier, a special-purpose third-order matrix multiplier can do chain-serial matrix multiplication for the FIG. 10 system.

Figure 11:
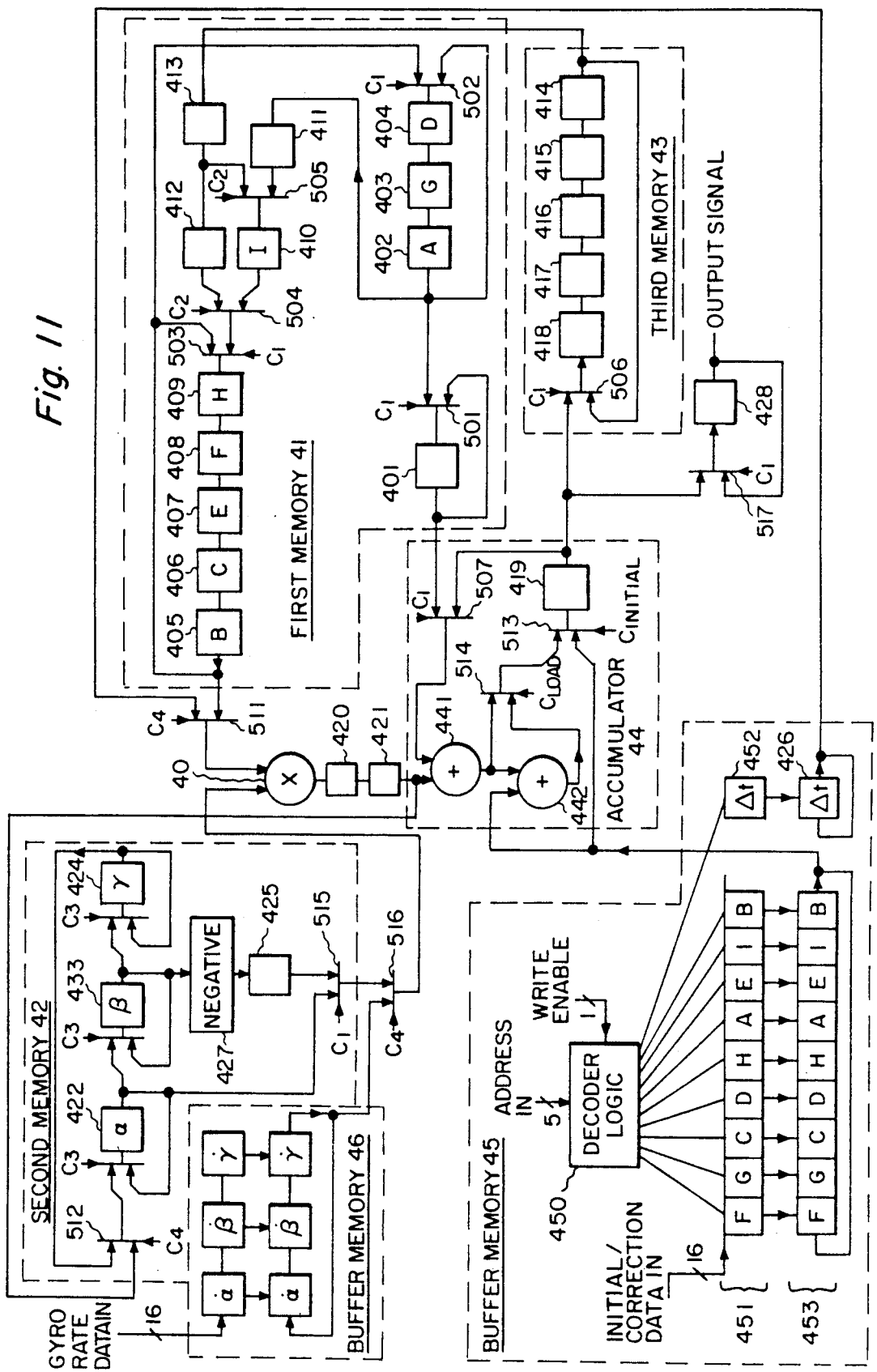
FIG. 11 is a schematic diagram of a chain-matrix multiplier embodying the invention, for performing the second form of chain-serial matrix multiplying described above in a specialized way in an inertial transformation matrix generator.
Figure 13D:
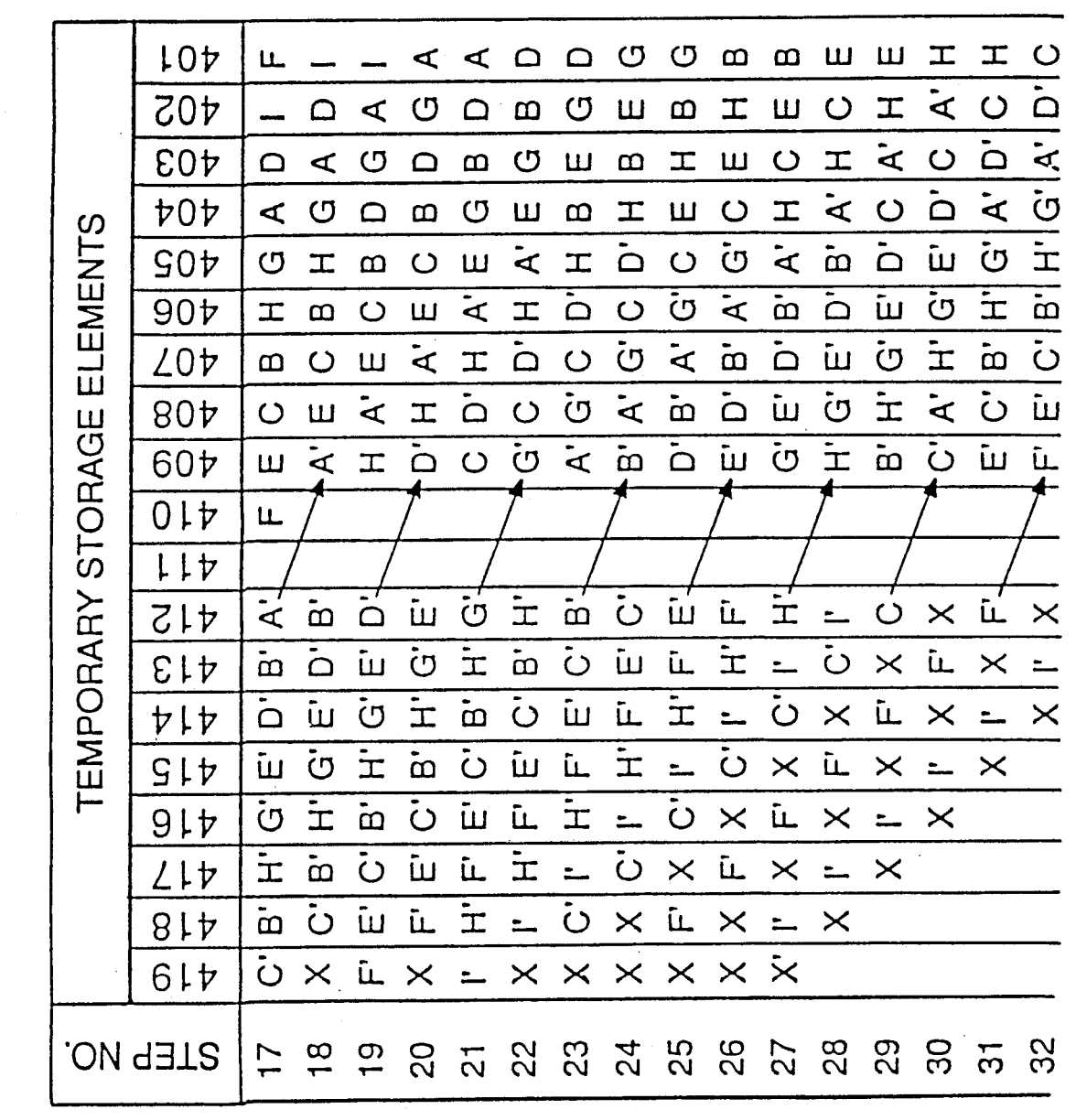

FIG. 11 is a schematic diagram of a special-purpose chain-serial matrix multiplier for the FIG. 10 system. FIG. 12 is a table of the control signals used in the FIG. 11 matrix multiplier. FIG. 13 comprised of FIGS. 13a, 13b, 13c and 13d, is a table describing the contents of temporary storage elements 401-419 in a first memory 41 and a third memory 43 of the FIG. 11 matrix multiplier during its continuing operation. FIG. 14 is a table describing the contents of temporary storage elements in a second memory 42 of the FIG. 11 matrix multiplier and of temporary storage elements between a multiplier 40 in FIG. 11 matrix multiplier and its second memory 42 during integration of gyro rate information. Multiplier 40 and ensuing sample-word-interval delay elements 420 and 421 are the equivalent of an actual pipeline multiplier having a two-word delay in generating major product.

One of the design goals for the FIG. 11 matrix multiplier was to develop most of the control signals using a simple binary counter, rather than using a three-stage ternary counter. Accordingly, as can be discerned from the FIG. 12 table of control signals, a 32-step operating cycle is used. Control signal $C_1$ and $C_2$ can be provided by the least significant bit and the most significant bit, respectively, of the count output signal of a five-stage binary up counter. Control signal $C_4$ can be simply generated by ANDing the most significant bit and the next most significant bit of the count output signal of the five-stage counter. Control signal $C_3$ can be generated by decoding the six and twelve counts from the binary counter and ORing the decoder output signals with control signal $C_4$. During the 32-step operating cycle a single digital multiplier 40 in the FIG. 11 matrix multiplier is used on a time-division-multiplexed basis both to integrate the gyro rate information and to perform the multiplications associated with the matrix multiplication for updating the third-order Euler transformation matrix. The integration of gyro rate information takes place in steps 25-32 of the operating cycle.

The elements of a preceding Euler matrix [E(t)] are defined as A, B, C, D, E, F, G, H, I, and each step of the chain-serial matrix multiplication to establish the current Euler matrix [E(t+Δt)] should be as follows:

$$[E(t+\Delta t)] = [E(t)] \cdot [T]$$

$$[E(t + \Delta)] = [E(t)] \cdot [T] \qquad (17)$$

$$= \begin{bmatrix} A & B & C \\ D & E & F \\ G & H & I \end{bmatrix} \cdot \begin{bmatrix} 1 & -\alpha & \beta \\ \alpha & 1 & -\gamma \\ -\beta & \gamma & 1 \end{bmatrix}$$

This chain-serial matrix multiplication is carried out during steps 1-18 of the operating cycle, with two steps of the operating cycle being taken up with generating each element of the new matrix, rather than three as in the FIG. 1 chain-serial matrix multiplier. This is possible because the multiplications by unity-valued elements in the matrix [T] need not be carried out by the single digital multiplier 40. Rather, an element to be multiplied by such unity-valued element defines the product of such multiplication and can be directly routed to an accumulator 44 following multiplier 40, rather than using multiplier 40 to perform these trivial "multiplications" on a pro forma basis. (Other trivial multiplications of elements such as multiplications in which one element is predeterminedly zero or an integral power of two can also be performed parallely to the single digital multiplier in other chain-serial matrix multiplication procedures.)

The multiplicand matrix is scanned in row major order once, multiplying the successive elements in each row by 1, $\alpha$ and $-\beta$ respectively of a column vector of the multiplier matrix. One could arrange to rescan the multiplicand matrix in row major order twice again, multiplying the successive elements in each row by the column vector $-\alpha$, 1 and $\gamma$ respectively in the first rescanning and by the column vector $\beta$, $-\alpha$ and 1 respectively in the second rescanning. Rather than doing this or rather than ordering the steps of the matrix multiplication as in the FIG. 1 or FIG. 2 matrix multipliers, steps are taken to multiply the elements in the multiplicand matrix by the barrel-shifted column vector 1, $\gamma$ and $-\alpha$ and then by the barrel-shifted column vector 1, $\beta$ and $-\gamma$. This is made possible by providing compensatory barrel shifts in the positions of elements in the rows of the multiplicand matrix between each scanning in row major order and by considering the product matrix also to have corresponding barrel shifts in the positions of elements in its rows. These barrel shifts of elements in the columns of the multiplier matrix and in the rows of the multiplicand and product matrices are implementable using serial memories. When a complete matrix multiplication has been carried out, the three successive barrel shifts of elements in the rows of the product matrix during the matrix multiplication has restored the original positions of these elements.

(A barrel shift right by n places is a shift right where the last n places shifted rightward successively fill the n places vacated at the left by the shift right, rather than being discarded as in a conventional shift right; and a barrel shift left by n places is a shift left where the last n places shifted leftward successively fill the n places vacated at the right by the shift left, rather than being discarded as in a conventional shift left.)

The initial loading of temporary sample storage elements 401–413 in first memory 41 of the FIG. 11 matrix multiplier is made via the serial third memory 43 comprising temporary sample storage elements 412–418 and multiplexer 506, and via a temporary sample storage element 419 and a multiplexer 513 in an accumulator 44. FIGS. 13a and 13b are tables of temporary sample storage element conditions that obtain in the first and second halves respectively at the initial 32-step cycle of operation, during which this initial loading is done. Control signal $C_{INITIAL}$ applied to the multiplexer 513 is high the first twenty-one steps of the first 32-step operating cycle, conditioning multiplexer 513 to load the A-I elements of the initial multiplicand matrix from a double-buffer random-access memory 45.

RAM 45 includes parallel load registers 451 into respective ones of which initial data samples A-I are asynchronously loaded, as shown, under control of decoder logic 450. RAM 45 also includes a parallel load register 452 into which Δt samples are asynchronously loaded, again under control of decoder logic 450. RAM 45 includes parallel-to-serial registers 453 to which the A-I initial data samples are parallely loaded, which registers 453 are synchronously operated and connected to provide serial memory. RAM 45 also includes a register 426 connected to receive successive Δt samples and recirculate each of them in a synchronous serial memory operation. As will be described later on, registers 451 and 453 are also used to store correction data temporarily until such time as it is admitted into accumulator 44.

RAM 45 has previously stored initialization data furnished from the inertial navigation system and now supplies them in the successive order XXXAXDXGXDXEXHXCXFXI during steps 1–21 of the initial 32-step operating cycle. After three don't-care samples, this sequence is the matrix samples in column major order alternating with don't care samples, the don't care values being indicated by X's. The one-sample delay afforded by temporary storage element 419 causes the alternate samples A, D, G, B, E, H, C, F AND I to be supplied to the input port of multiplexer 506 selected during odd-numbered steps for supplying signal to cascaded temporary sample storage elements 418, 417, 416, 415, 414 in the third memory 43. After that one passage through the cascaded temporary storage elements in third memory 43 the alternate samples are, however, fed back to the input port of multiplexer 506 selected during even-numbered steps for supplying signal to the cascaded storage elements 418, 417, 416, 415, 414 of third memory 43, to time interleave with their successors. After one passage through the cascaded temporary storage elements in third memory 43, the alternate samples are delayed an additional sample interval in each of the cascaded temporary sample storage elements 413 and 412 to arrive at input ports of multiplexers 505 and 504 not selected for connection to their output ports at the time those samples arrive. After that one passage through the cascaded temporary storage elements in third memory 43 the alternate samples are, however, fed back to the input port of multiplexer 506 selected during even-numbered steps for supplying signal to the cascaded storage elements 418, 417, 416, 415, 414 of third memory 43, to time interleave with their successors.

After the second passage of these alternate samples through the cascaded temporary storage elements in third memory 43 to time interleave with the other initial samples and after one sample further delay in a clocked temporary storage element 413 these initial samples arrive at the input port of a multiplexer 505 selected at those times for connection to its output ports. The initial samples routed through multiplexer 505 to a clocked temporary storage element 410 are except for the final sample not selected by a multiplexer 504 for connection to its output port. The initial samples, after an additional sample delay in a clocked temporary sample storage element 412, arrive at the input port of multiplexer 504 selected to its output port during all the initial samples except the last I sample.

A multiplexer 503 selects to its output port only during odd-numbered steps of the operating cycle its input port connected from the output port of multiplexer 504, so initial samples flow through multiplexer 504 to the cascaded temporary sample storage elements 409, 408, 407, 406 and 405 only after these samples have completed one recirculation through the serial third memory 43 so they reach multiplexer 503 on an odd-numbered step of the operating cycle. Similarly, a multiplexer 502 selects samples supplied from one-sample-delay clocked temporary sample storage element 405 only during odd-numbered steps of the operating cycle, so only initial samples recirculated through cascaded temporary storage elements 409, 408, 407, 406 and 405 are applied to cascaded clocked temporary storage elements 404, 403 and 402. Again similarly, a multiplexer 501 selects samples supplied from temporary storage element 402 only during odd-numbered steps of the operating cycle, which causes each successive sample so selected to appear twice in succession as applied to accumulator 430.

After the first twenty-one steps of the first 32-step operating cycle, the control signal $C_{INITIAL}$ is low. So third memory 43 is loaded during successive operating cycles using updated matrix elements as accumulated by accumulator 4. Insofar as the third memory 43 and first memory 41 are concerned, loading of updated matrix elements takes place in these successive operating cycles much the same as loading of initial matrix elements takes place in the first operating cycle.

Beginning with the twenty-fifth step of each operating cycle and continuing through its last step, the matrix elements to be temporarily stored in second memory 42 for use in the next 32-step operating cycle are generated. A multiplication factor, Δt, is loaded into temporary storage element 426 within the buffer RAM 45 during the twenty-fifth step and control signal $C_4$ applied to multiplexer 511 is high conditioning multiplexer 511 to apply Δt (recirculated in temporary storage element 426) to multiplier 40 as multiplicand signal during steps 25–32. A multiplexer 516 is conditioned by $C_4$ being high to select to multiplier 40 as multiplier signal read-out from a double-buffer random-access memory 46 during steps 25–32. The α, β and γ elements for the Euler transformation matrix are delivered from multiplier 40 as products via the cascade connection of temporary storage elements 420 and 421 during steps 28–30.

During steps 25–32, control signal $C_4$ applied to multiplexer 512 is high, and control signal $C_3$ applied to multiplexers 508, 509 and 510 is high. Accordingly, multiplexers 508–510 and 512 are conditioned to include temporary sample storage elements 422, 423 and 424 in cascade connection with temporary storage elements 420 and 421. This permits the α, β and γ products to be shifted to positions in temporary storage elements 424, 423 and 422, respectively, for the beginning of the next operating cycle. A temporary sample storage element 425 receives as input signal the negative of the output signal from temporary storage element 423, as generated by elements 427, and so stores $-\beta$ product as the beginning of the next operating cycle.

FIGS. 13c and 13d show the samples stored in temporary storage elements 401-419 during each step of the first and second halves respectively of this next operating cycle. The matrix elements stored in temporary storage elements 402-409 at the beginning of this operating cycle are shown in the blocks representing these elements in FIG. 11. Updated matrix element A' that replaces the original matrix element A is calculated by inserting samples B and C into multiplier 40 following the first and second steps, respectively, to be multiplied by α and $-\beta$ values, respectively. The major products of these multiplications are delayed one clock cycle to be clocked into temporary storage element 420 following the second and third steps and then into temporary storage element 421 following the third and fourth steps. Following the third step, adder 441 in the accumulator 440 receives as a first input signal the A sample from storage element 401, as selected by multiplexer 507 responding to control signal $C_1$ being high, and receives as a second signal the delayed product αB from storage element 421. The sum output signal from adder 441 is inserted into storage element 419. Following any even-numbered step, control signal $C_1$ is low, conditioning multiplexer 506 in third memory 43 to continue circulating samples already contained therein, rather than accepting a new sample being written thereinto. So, following the fourth step, adder 441 receives as a first input signal the sum output signal temporarily stored in storage element 419, as selected by multiplexer 507 responding to control signal $C_1$ being low. Adder 441 receives as its second input signal the delayed product $-\beta C$ from storage element 421. Adder 441 delivers its sum output signal to storage element 419. Following the fifth step (or any odd-numbered step) control signal $C_1$ applied to multiplexer 506 is high, conditioning it to write the accumulation result temporarily stored in storage element 19 into the serial third memory 43. So the accumulation result $A'=A+\alpha B-\beta C$ is transferred from temporary storage element 419 to temporary storage element 420 between the fifth and sixth steps of the operating cycle.

During the third step samples E and F have advanced to storage elements 405 and 406, and sample D has advanced to storage element 402( Samples E and F enter multiplier 40 following the third and fourth steps, respectively, to be multiplied by α and $-\beta$ values respectively. The major products of these multiplications are delayed by one clock cycle to be clocked into storage element 420 following the fourth and fifth steps and then into temporary storage element 421 following the fifth and sixth steps. Following the third step, multiplexer 501 responding to control signal $C_1$ being high writes sample D into storage element 401. Following the fourth step, multiplexer 501 responding to control signal $C_1$ being low reads D sample to rewrite storage element 401. Following the fifth step, adder 441 receives via multiplexer 507 sample D from storage element 401 as one input signal and receives the delayed product αE from storage element 421 as its other input signal. Multiplexer 507 operates to circulate the sum signal inserted from adder 441 into storage element 419 back to adder 441 following the sixth step, to be added with the delayed product $-\beta F$ read from storage element 421. Following the seventh step multiplexer 506 writes into third memory 43 the accumulation result $D'=D+\alpha E-\beta F$ until then temporarily stored in storage element 419.

During the fifth step, samples H and I have advanced to storage elements 405 and 406, and sample G has advanced to storage element 402. Samples H and I enter multiplier 40 following the third and fourth steps, respectively, to be multiplied by α and $-\beta$ values respectively. The major products of these multiplications are delayed by one clock cycle to be clocked into storage element 420 following the sixth and seventh steps and then into temporary storage element 421 following the seventh and eighth steps. Following the fifth step, multiplexer 501 responding to control signal $C_1$ being high writes sample G into storage element 401. Following the sixth step, multiplexer 501 responding to control signal $C_1$ being low reads sample G to rewrite storage element 401. Following the seventh step, adder 441 receives via multiplexer 507 sample G from storage element 401 as one input signal and receives the delayed product αH from storage element 421 as its other input signal. Multiplexer 507 operates to circulate the sum signal inserted from adder 441 into storage element 419 back to adder 431 following the eighth step, to be added with the delayed product $-\beta I$ read from storage element 421. Following the ninth step multiplexer 506 writes into third memory 43 the accumulation result $G'=G+\alpha H-\beta I$ until then temporarily stored in storage element 419.

As one may note from referring to FIG. 14 table of temporary storage element conditions in second memory 42, control signal $C_3$ being high during the sixth step causes circulation of elements γ, α and β from temporary storage elements 422, 423 and 424, respectively to temporary storage elements 423, 424 and 422, respectively, following the twelfth step, to repose therein through the eighteenth step. Following the seventh step the negative of the value α that is stored in storage element 413 is written into storage element 425, to repose therein through the twelfth step.

During the seventh step, samples C and A have advanced to storage elements 405 and 406, and sample D has advanced to storage element 402. Samples C and A enter multiplier 40 following the seventh and eighth steps, respectively to be multiplied by γ and $-\alpha$ values respectively. The major products of these multiplications are delayed by one clock cycle to be clocked into storage element 420 following the eighth and ninth steps and then into temporary storage element 421 following the ninth and tenth steps. Following the seventh step, multiplexer 501 responding to control signal $C_1$ being high writes sample B into storage element 401 as A sample is read out. Following the eighth step, multiplexer 501 responding to control signal $C_1$ being low reads sample B to rewrite storage element 401. Following the ninth step, adder 441 receives via multiplexer 507 sample B from storage element 401 as one input signal and receives the delayed product γC from storage element 421 as its other input signal. Multiplexer 507 operates to circulate the sum signal inserted from adder 441 into storage element 419 back to adder 441 following the tenth step, to be added with the delayed product $-\alpha A$ read from storage element 421. Following the eleventh step multiplexer 506 writes into third memory 43 the accumulation $B'=B+\gamma C-\alpha A$ until then temporarily stored in storage element 419.

During the ninth step, samples F and D have advanced to storage elements 405 and 406, and sample E has advanced to storage element 402. Samples F and D enter multiplier 40 following the ninth and tenth steps, respectively to be multiplied by $\gamma$ and $\alpha$ values respectively. The major products of these multiplications are delayed by one clock cycle to be clocked into storage element 420 following the tenth and eleventh steps and then into temporary storage element 421 following the eleventh and twelfth steps. Following the ninth step, multiplexer 501 responding to control signal $C_1$ being high writes sample E into storage element 401. Following the tenth step, multiplexer 501 responding to control signal $C_1$ being low reads sample E to rewrite storage element 401. Following the eleventh step, adder 441 receives via multiplexer 507 sample E from storage element 401 as one input signal and receives the delayed product $\gamma F$ from storage element 421 as its other input signal. Multiplexer 507 operates to circulate the sum signal inserted from adder 441 into storage element 419 back to adder 441 following the twelfth step, to be added with the delayed product $-\alpha D$ read from storage element 421. Following the thirteenth step multiplexer 506 writes into third memory 43 the accumulation $E'=E+\gamma F-\alpha D$ until then temporarily stored in storage element 419.

During the eleventh step samples I and G have advanced to storage elements 405 and 406, and sample D has advanced to storage element 402. Samples I and G enter multiplier 40 following the eleventh and twelfth steps, respectively to be multiplied by $\gamma$ and $-\alpha$ values respectively. The major products of these multiplications are delayed by one clock cycle to be clocked into storage element 420 following the twelfth and thirteenth steps and then into temporary storage element 421 following the thirteenth and fourteenth steps. Following the eleventh step, multiplexer 501 responding to control signal $C_1$ being high writes sample H into storage element 401. Following the twelfth step, multiplexer 501 responding to control signal $C_1$ being low reads sample H to rewrite storage element 401. Following the thirteenth step, adder 441 receives via multiplexer 507 sample H from storage element 401 as one input signal and receives the delayed product $\gamma I$ from storage element 421 as its other input signal. Multiplexer 507 operates to circulate the sum signal inserted from adder 441 into storage element 419 back to adder 441 following the sixth step, to be added with the delayed product $-\alpha G$ read from storage element 421. Following the seventh step multiplexer 506 writes into third memory the accumulation result $H'=H+\alpha I-\gamma G$ temporarily stored in storage element 419.

As one may note from referring to FIG. 14 table of temporary storage element conditions in second memory 42, control signal $C_3$ being high during the twelfth step causes circulation of elements $\gamma$, $\alpha$ and $\beta$ from temporary storage elements 422, 423 and 424, respectively, to temporary storage elements 423, 424 and 422, respectively, following the twelfth step, to repose therein through the eighteenth step. Following the thirteenth step the negative of the value $\gamma$ that is stored in storage element 423 is written into storage element 425, to repose therein through the eighteenth step.

During the thirteenth step samples A and B have advanced to storage elements 405 and 406, and sample C has advanced to storage element 402. Samples A and B enter multiplier 40 following the thirteenth and fourteenth steps, respectively to be multiplied by $\gamma$ and $-\alpha$ values respectively. The major products of these multiplications are delayed by one clock cycle to be clocked into storage element 420 following the fourteenth and fifteenth steps and then into temporary storage element 421 following the fifteenth and sixteenth steps. Following the third step, multiplexer 501 responding to control signal $C_1$ being high writes sample C into storage element 401. Following the fourteenth step, multiplexer 501 responding to control signal $C_1$ being low reads D sample to rewrite storage element 401. Following the fifteenth step, adder 441 receives via multiplexer 507 sample C from storage element 401 as one input signal and receives the delayed product $\beta A$ from storage element 421 as its other input signal. Multiplexer 507 operates to circulate the sum signal inserted from adder 441 into storage element 419 back to adder 441 following the sixteenth step, to be added with the delayed product $-\gamma B$ read from storage element 421. Following the seventeenth step multiplexer 506 writes into third memory 43 the accumulation result $C'=C+\beta A-\gamma B$ until then temporarily stored in storage element 419.

During the fifteenth step samples D and E have advanced to storage elements 405 and 406, and sample F has advanced to storage element 402. Samples D and E enter multiplier 40 following the fifteenth and sixteenth steps, respectively to be multiplied by $\beta$ and $-\gamma$ values respectively. The major products of these multiplications are delayed by one clock cycle to be clocked into storage element 420 following the sixteenth and seventeenth steps and then into temporary storage element 421 following the seventeenth and eighteenth steps. Following the fifteenth step, multiplexer 501 responding to control signal $C_1$ being high writes sample F into storage element 401 out. Following the sixteenth step, multiplexer 501 responding to control signal $C_1$ being low reads sample F to rewrite storage element 401. Following the seventeenth step, adder 441 receives via multiplexer 507 sample F from storage element 401 as one input signal and receives the delayed product $\beta D$ from storage element 421 as its other input signal. Multiplexer 507 operates to circulate the sum signal inserted from adder 441 into storage element 419 back to adder 441 following the eighteenth step, to be added with the delayed product $-\gamma E$ read from storage element 421. Following the nineteenth step multiplexer 506 writes into third memory 43 the accumulation result $F'=F+\beta D-\gamma E$ temporarily stored in storage element 419.

During the seventeenth step samples G and H have advanced to storage elements 405 and 406, and sample I has advanced to storage element 402. Samples G and H enter multiplier 40 following the seventeenth and eighteenth steps, respectively to be multiplied by $\beta$ and $-\gamma$ values respectively. The major products of these multiplications are delayed by one clock cycle to be clocked into storage element 420 following the eighteenth and nineteenth steps and then into temporary storage element 421 following the nineteenth and twentieth steps. Following the seventeenth step, multiplexer 501 responding to control signal $C_1$ being high writes sample I into storage element 401. Following the eighteenth step, 15 multiplexer 501 responding to control signal $C_1$ being low reads sample I to rewrite storage element 401. Following the nineteenth step, adder 441 receives via multiplexer 507 sample I from storage element 401 as one input signal and receives the delayed product $\beta G$ from storage element 421 as its other input signal. Multiplexer 507 operates to circulate the sum signal inserted from adder 441 into storage element 419 back to adder 441 following the sixth step, to be added with the delayed product $-\gamma H$ read from storage element 421. Following the twenty-first step multiplexer 506 writes into third memory 43 the accumulation result $\Gamma = I + \beta G - \gamma H$ until then temporarily stored in storage element 419.

During the operations just described a multiplicand matrix element clocked out of temporary storage element 405 after being available as an input signal to multiplier 40 during an odd-numbered step of the operating cycle will not be recirculated to element 409 by reason of multiplexer 503 being conditioned by control signal $C_1$ being low to instead admit a new matrix element. $C_2$ is low during steps 1-16 of the operating cycle, conditioning multiplexers 504 and 505 to connect temporary storage element 410 in cascade connection after temporary storage elements 404-403, 402 and 411. Following step 1, sample I is clocked forward into storage element 409. The sample clocked out of storage element 405 after an odd-numbered step of the operating cycle is selected to storage element 404 by multiplexer 502 responding to $C_1$ having been high during the odd-numbered step. A multiplicand matrix element clocked out of storage element 405 during an even-numbered step of the operating cycle is selected back to storage element 409 by multiplexer 503 responding to control signal $C_1$ being low. Similarly, a multiplicand matrix element clocked out of storage element 402 during an even-numbered step of the operating cycle is selected back to storage element 404 by multiplexer 502 responding to control signal $C_1$ being low. The sample is thus preserved in the cascade connection of storage elements 404, 403, 402 even though that sample as it proceeds following the even-numbered step to storage element 411 will after being clocked through storage element 412 not be selected to storage element 409 but rather discarded by action of multiplexer 503.

The FIG. 11 chain-serial matrix multiplier is adapted for entering inertial navigation system corrections at selected times using a further adder 442 in accumulator 44 Responsive to the normally low control signal $C_{LOAD}$ being high at appropriate times adder 441 output signals with corrections added to them in adder 442 are selected to third memory, 43 rather than adder 441 output signals without such corrections. These corrections are delivered from the same buffer RAM 45 used to load initial matrix data.

Output signal is shown in FIG. 11 as being taken from the output of accumulator 44 and having some of the nonuseful samples replaced with repeated useful samples. This replacement is done by a multiplexer 517 responding to control signal $C_1$ a temporary storage element 428 connected as a further serial memory. Alternately, output signal can be taken from the output port of any of the storage elements 413-418.

One skilled in the art and acquainted with the foregoing disclosure is enabled to design a number of variants of the chain-serial multipliers described above, using the principles of the invention taught herein. This should be borne in mind in constructing the scope of the claims which follow, the intention of the inventors being that the following claims encompass all such variants made within the spirit of their invention.

What is claimed is:

1. A chain-serial matrix multiplier comprising:

a first memory for temporarily storing each of a first series of matrices that have m lines of n elements each, successive ones of said first series of matrices being identified by respective consecutive ordinal numbers beginning at zeroeth and ending with $p^{th}$, where m is an integer at least one, n is an integer at least two, and p is an integer at least two and is equal to the number of matrix multiplications in said chain-serial matrix multiplication;

a second memory for temporarily storing each of a second series of matrices that have n lines of n elements each which n lines are orthogonal to the m lines of n elements in each of said first series of matrices, successive ones of said second series of matrices being identified by successive ordinal numbers beginning with $(p+1)^{th}$ and ending with $2p^{th}$;

initializing means for writing said first memory with the elements of said zeroeth matrix;

means for periodically writing said second memory so as to store the next successive one of said $(p+1)^{th}$ through $2p^{th}$ matrices;

means for reading successive ones of said zeroeth through $(p-1)^{th}$ matrices from said first memory;

means for reading successive ones of said $(p+1)^{th}$ through $2p^{th}$ matrices from said second memory concurrently with reading successive ones of said zeroeth through $(p-1)^{th}$ matrices from said first memory;

means for generating elements of successive ones of said first through $p^{th}$ matrices by matrix multiplying successive ones of said zeroeth through $(p-1)^{th}$ matrices as read from said first memory by respective successive ones of said $(p-1)^{th}$ through $2p^{th}$ matrices as read from said second memory;

a third memory for temporarily storing elements of successive ones of said first through $p^{th}$ matrices for a time after they are generated; and means for reading the temporarily stored elements of each successive one of said first through $p^{th}$ matrices from said third memory and writing them into said first memory to replace corresponding elements in the preceding matrix stored in said first memory at a time after those corresponding elements are no longer needed by said means for generating.

2. A chain-serial matrix multiplier as set forth in claim 1 wherein m and n are equal to each other.

3. A chain-serial matrix multiplier as set forth in claim 1 wherein the m lines of n elements each in said first series of matrices are m rows of n elements each.

4. A chain-serial matrix multiplier as set forth in claim 1 wherein the m lines of n elements each in said first series of matrices are in columns of n elements each.

5. A chain-serial matrix multiplier comprising:

a first memory for temporarily storing each of a first series of matrices that have m lines of n elements each, successive ones of said first series of matrices being identified by respective consecutive ordinal numbers beginning at zeroeth and ending with $p^{th}$, where m is an integer at least one, n is an integer at least two, and p is an integer at least two and is equal to the number of matrix multiplications in said chain-serial matrix multiplication;

a second memory for temporarily storing each of a second series of matrices that have n lines of n elements each which n lines are orthogonal to the m lines of n elements each of said first series of matrices, successive ones of said second series of matrices being identified by successive ordinal numbers beginning with $(p+1)^{th}$ and ending with $2p^{th}$;

initializing means for writing said first memory with the elements of said zeroeth matrix;

means for periodically writing said second memory so as to store the next successive one of said $(p+1)^{th}$ through $2p^{th}$ matrices;

means for reading from said first memory each successive line of each successive one of said zeroeth through $(p-1)^{th}$ matrices n-fold times to generate a first stream of matrix elements;

means for reading line by line from said second memory each successive one of said second series of matrices n-fold times to generate a second stream of matrix elements;

means for multiplying together each pair of concurrent matrix elements in said first and second streams of matrix elements to generate a respective product;

means for accumulating the serially generated said products over each successive line read from said first and second memories, for generating said elements of successive ones of said first through $p^{th}$ matrices;

a third memory for temporarily storing elements of successive ones of said first through $p^{th}$ matrices for a time after they are generated; and means for reading the temporarily stored elements of each successive one of said first through $p^{th}$ matrices from said third memory and writing them into said first memory to replace corresponding elements in the preceding matrix stored in said first memory at a time after those corresponding elements are no longer needed by said means for generating.

6. A chain-serial matrix multiplier as set forth in claim 5 wherein said means for reading from said first memory each successive line of each successive one of said zeroeth through $(p-1)^{th}$ times is of a type not permuting the order of the n elements in each line upon re-reading; wherein said means for reading line by line from said second memory each successive one of said second series of matrices n-fold times is of a type not permuting the order of the n elements in each line upon re-reading; and wherein said third memory is of a type written and read in such orders as to transpose each of said first through $p^{th}$ matrices temporarily stored therein, between that matrix being written into and read from said third memory.

7. A chain-serial matrix multiplier as set forth in claim 6 wherein said third memory is a serial memory.

8. A chain-serial matrix multiplier as set forth in claim 7 wherein said second memory is a serial memory.

9. A chain-serial matrix multiplier as set forth in claim 8 wherein said first memory includes n component serial memories, one for each line of n elements in matrices of said first series, includes an input multiplexer for writing respective lines of said first series of matrices to said n component memories, and includes an output multiplexer for reading from said n component serial memories to generate said first stream of matrix elements.

10. A chain-serial matrix multiplier as set forth in claim 9 wherein said first and second streams of matrix elements are bit-serial streams; wherein said first, second and third memories store data in bit-serial form; and wherein said means for multiplying and said means for accumulating perform their processing functions bit-serially.

11. A chain-serial matrix multiplier comprising:

a first memory for temporarily storing each of a first series of matrices that have m lines of n elements each, successive ones of said first series of matrices being identified by respective consecutive ordinal numbers beginning at zeroeth and ending with $p^{th}$, where m is an integer at least one, n is an integer at least two, and p is an integer at least two and is equal to the number of matrix multiplications in said chain-serial matrix multiplication;

a second memory for temporarily storing each of a second series of matrices that n lines of n elements each which n lines are orthogonal to the m lines of n elements each of said first series of matrices, successive ones of said second series of matrices being identified by successive ordinal numbers beginning with $(p+1)^{th}$ and ending with $2p^{th}$;

initializing means for writing said first memory with the elements of said zeroeth matrix;

means for periodically writing said second memory so as to store the next successive one of said $(p+1)^{th}$ through $2p^{th}$ matrices;

means for reading line by line from said first memory each successive one of said zeroeth through $(p-1)^{th}$ matrices n-fold times to generate a first stream of matrix elements;

means for reading from said second memory each successive line of each successive one of said second series of matrices n-fold times to generate a second stream of matrix elements;

means for multiplying together each pair of concurrent matrix elements in said first and second streams of matrix elements to generate a respective product;

means for accumulating the serially generated said products over each successive line read from said first and second memories, for generating said elements of successive ones of said first through $p^{th}$ matrices;

a third memory for temporarily storing elements of successive ones of said first through $p^{th}$ matrices for a time after they are generated; and means for reading the temporarily stored elements of each successive one of said first through $p^{th}$ matrices from said third memory and writing them into said first memory to replace corresponding elements in the preceding matrix stored in said first memory at a time after those corresponding elements are no longer needed by said means for generating.

12. A chain-serial matrix multiplier as set forth in claim 11 wherein said means for reading line by line from said first memory each successive one of said zeroeth through $(p-1)^{th}$ matrices n-fold times is of a type not permuting the order of the n elements in each line upon re-reading; wherein said means for reading from said second memory each successive line of each successive one of said second series of matrices n-fold times is of a type not permuting the order of the n elements in each line upon re-reading; and wherein said third memory is of a type written and read in such orders as to transpose each of said first through $p^{th}$ matrices temporarily stored therein between that matrix being written into and read from said third memory.

13. A chain-serial matrix multiplier as set forth in claim 12 wherein said third memory is a serial memory.

14. A chain-serial matrix multiplier as set forth in claim 13 wherein said first memory is a serial memory.

15. A chain-serial matrix multiplier as set forth in claim 14 wherein said second memory includes n component serial memories, one for each line of n elements in matrices of said second series; includes an input multiplexer for writing respective lines of said second series of matrices to said n component memories; and includes an output multiplexer for reading from said n component serial memories to generate said second stream of matrix elements.

16. A chain-serial matrix multiplier as set forth in claim 11 wherein said first and second streams of matrix elements are bit-serial streams; wherein said first, second and third memories store data in bit-serial form; and wherein said means for multiplying and said means for accumulating perform their processing functions bit-serially.

17. A chain-serial matrix multiplier as set forth in claim 11 for use where each of said second series of matrices in each line thereof has an element of a prescribed value, multiplication by which is trivial, and has (n−1) other elements; wherein said means for reading from said second memory each successive line of each successive one of said second series of matrices n-fold-times is of a type barrel-shifting the order of the elements in each line read therefrom so as to read out seratim each said other element in said line after the time said element of prescribed value would be read out; and wherein said means for reading line by line from said first memory each successive one of said zeroeth through $(p-1)^{th}$ matrices n-fold times is of a type barrel-shifting the order of the n elements in each line read therefrom in accordance with the barrel-shifting of the line of n elements concurrently read from said second memory.

18. A chain-serial matrix multiplier as set forth in claim 17 wherein said means for reading line by line from said first memory is of a type for reading all except the first element of each barrel-shifted line from said first memory to an output port thereof through which said first stream of matrix elements flows and for reading the first element of each barrel-shifted line from said first memory via a further output port thereof; wherein said means for reading from said second memory each successive line of each successive one of said second series of matrices n-fold times is of a type for reading all except the first element of each barrel shifted line from said second memory to an output port thereof through which said second stream of matrix elements flows.

19. A chain-serial matrix multiplier as set forth in claim having:
means for applying the first element of each barrel-shifted line read from said first memory via said further output port thereof as an initial input signal for said means for accumulating. thereby to carry out a trivial multiplication thereof by said prescribed value.

20. A chain-serial matrix multiplier as set forth in claim 19 wherein said means for applying the first element of each barrel-shifted line as an initial signal for said means for accumulating so applies it without bit-place shift, whereby said trivial multiplication thereof by said prescribed value is a multiplication by plus one.

21. A chain-serial matrix multiplier as set forth in claim 18 wherein said second memory is of a type wherein said element of a prescribed value in each line is not actually stored.

22. A chain-serial matrix multiplier as set forth in claim 18 wherein said first and second streams of matrix elements are bit-serial streams; wherein said first, second and third memories store data in bit-serial form; and wherein said means for multiplying and said means for accumulating perform their processing functions bit-serially.

23. A chain-serial matrix multiplier as set forth in claim 11 wherein said means for multiplying is used, in time periods respectively preceding the generation of each successive one of said first through $p^{th}$ matrices, for multiplying successive ones of a set of input data samples by a factor, thereby to generate samples of said $(p+1)^{th}$ through $2p^{th}$ matrices respectively in succeeding ones of said time periods.

24. A chain-serial matrix multiplier as set forth in claim 11 wherein said first and second streams of matrix elements are bit-serial streams; wherein said first, second and third memories store data in bit-serial form; and wherein said means for multiplying and said means for accumulating perform their processing functions bit-serially.

25. A matrix multiplier comprising:
a first memory for temporarily storing elements of a first set of successive matrices, each of which first set of matrices has m rows and n columns, m being an integer greater than zero and n being an integer greater than one;
means for reading n-fold from said first memory each successive row of n elements stored therein, to generate a first stream of matrix element samples;
a second memory for temporarily storing elements of a second set of successive matrices, each of which second set of matrices has n rows and p columns, p being an integer greater than zero;
means for reading from said second memory each successive column of n elements stored therein synchronously with a respective one of the n-fold readings of each row of said first memory to generate a second stream of matrix element samples;
means for multiplying pairs of samples from said first and second streams of matrix elements to generate products, n successively generated ones of which products originating from a simultaneous reading of a row of said first memory and a column of said second memory can be considered as a respective group of said products; and
means for accumulating each said group of products to generate a respective one of accumulation results that occur every $n^{th}$ one of consecutive sample intervals in said first and second streams of matrix element samples;
a multiplexer having a first input port for receiving said accumulation results that occur every $n^{th}$ one of said consecutive sample intervals, having a second input port, and having an output port to which its said first input port is selected during said every $n^{th}$ one of said consecutive sample intervals and to which its said second input port is selected during said every other one of said consecutive sample intervals;
(n−1) delay elements each having a respective input port, having a respective output port, and exhibiting a one-sample-interval delay between its input and output ports, said delay elements being identified by consecutive ordinal numbers first through $(n-1)^{th}$; and a cascade connection of said first through $(n-1)^{th}$ delay elements in order of their ordinal numbers, to form a delay line having an overall delay of $(n-1)$-sample intervals with an input end connecting from the output port of said multiplexer and with an output end connecting to said second input port, whereby the matrix product of the matrices temporarily stored in said first and second matrices is available by rows at any point along said delay line.

26. A matrix multiplier as set forth in claim 25 wherein p is equal to n, arranged for chain-serial operation by being included in combination with;

means for writing each succeeding one of said first set of successive matrices into said first memory, one row at a time, each row of said first memory being written after the n-fold reading thereof and being written by a row of said matrix product supplied from a point along said delay line.

27. A chain-serial matrix multiplier as set forth in claim 26, wherein m is equal to n.

28. A chain-serial matrix multiplier as set forth in claim 26, wherein p is equal to n.

29. A matrix multiplier comprising:

a first memory for temporarily storing elements of a first set of successive matrices, each of which first set of matrices has n rows and p columns, n being an integer greater than one and p being an integer greater than zero;

a second memory for temporarily storing elements of a second set of successive matrices, each of which first set of matrices has m rows and n columns, m being an integer greater than zero;

means for reading from said first memory each successive column of n elements stored therein n-fold, to generate a first stream of matrix element samples;

means for reading from said second memory each successive row of n elements stored therein synchronously with a respective one of the n-fold readings of each column of said first memory to generate a second stream of matrix element samples;

means for multiplying pairs of samples from said first and second streams of matrix elements to generate products, n successively generated ones of which products originating from a simultaneous reading of a column of said first memory and a row of said second memory can be considered as a respective group of said products; and means for accumulating each of said group of products to generate a respective one of accumulation results that occur every $n^{th}$ one of consecutive sample intervals in said first and second streams of matrix element samples;

a multiplexer having a first input port for receiving said accumulation results that occur every $n^{th}$ one of said consecutive sample intervals, having a second input port, and having an output port to which its said first input port is selected during said every $n^{th}$ one of said consecutive sample intervals and to which its said second input port is selected during said every other one of said consecutive sample intervals;

$(n-1)$ delay elements each having a respective input port, having a respective output port, and exhibiting a one-sample-interval delay between its input and output ports, said delay elements being identified by consecutive ordinal numbers first through $(n-1)^{th}$; and a cascade connection of said first through $(n-1)^{th}$ delay elements in order of their ordinal numbers, to form a delay line having an overall delay of $(n-1)$-sample intervals between said output port of said multiplexer and its said second input port, whereby the matrix product of the matrices temporarily stored in said first and second matrices is available by columns at any point along said delay line.

30. A matrix multiplier as set forth in claim 29 wherein m is equal to n, arranged for chain-serial operation by being included in combination with:

means for writing each succeeding one of said first set of successive matrices into said first memory, one column at a time, each column of said first memory being written after the n-fold reading thereof and being written by a column of said matrix product supplied from a point along said delay line.

31. A matrix multiplier as set forth in claim 29 wherein p is equal to n, arranged for chain-serial operation by being included in combination with:

means for writing each succeeding one of said second set of successive matrices into said second memory from a point along said delay line after reading each preceding one of said second set of successive matrices from said second memory.

32. A chain-serial matrix multiplier as set forth in claim 31 wherein m is equal to n.

33. A matrix multiplier comprising:

a first memory for temporarily storing elements of a first set of successive matrices, each of which said first set of matrices has m rows and n columns, m being an integer greater than zero and n being an integer greater than one;

a second memory for temporarily storing elements of a second set of successive matrices, each of which second set of matrices has n rows and p columns, p being an integer greater than zero;

means for reading n-fold from said first memory each successive row of n elements stored therein, to generate a first stream of matrix element samples;

means for reading from said second memory each successive column of n elements stored therein synchronously with a respective one of the n-fold readings of each row of said first memory to generate a second stream of matrix element samples;

means for multiplying pairs of samples from said first and second streams of matrix elements to generate products, n successively generated ones of which products originating from a simultaneous reading of a row of said first memory and a column of said second memory can be considered as a respective group of said products; and means for accumulating each said group of products to generate a respective accumulation result;

a multiplexer having a first input port for receiving said accumulation results that occur every $n^{th}$ of consecutive sample intervals, having a second input port, and having an output port to which its said first input port is selected during said every $n^{th}$ of the consecutive sample intervals and to which its said second input port is selected during said every other of the consecutive sample intervals;

$(n-1)$ delay elements each having a respective input port, having a respective output port, and exhibiting a one-sample-interval delay between its input and output ports, said delay elements being identified by consecutive respective ordinal numbers first through $(np-1)^{th}$;

a cascade connection of said $(np-1)$ delay elements in order of their ordinal numbers, to form a delay line having an overall delay of $(np-1)$ sample intervals between the output port of said multiplexer and its second input port, whereby the matrix product of the matrices temporarily stored in said first and second matrices is available by rows at any point along said delay line.

34. A matrix multiplier as set forth in claim 33 wherein m is equal to n, arranged for chain-serial operation by being included in combination with:
means for writing each succeeding one of said second set of successive matrices into said second memory from a point along said delay line after reading each preceding one of said second set of successive matrices from said second memory.

35. A chain-serial matrix multiplier as set forth in claim 34 wherein p is equal to n.

36. A matrix multiplier comprising:
a first memory for temporarily storing elements of a first set of successive matrices, each of which first set of successive matrices has n rows and p columns, n being an integer greater than one and p being an integer greater than zero;
a second memory for temporarily storing elements of a second set of successive order matrices, each of which second set of matrices has m rows and n columns, m being an integer greater than zero;
means for reading n-fold from said first memory each successive column of n elements stored therein, to generate a first stream of matrix element samples;
means for reading from said second memory each successive row of n elements stored therein synchronously with a respective one of the n-fold readings of each column of said first memory to generate a second stream of matrix element samples;
means for multiplying pairs of samples from said first and second streams of matrix elements to generate products n successively generated ones of which products originating from a simultaneous reading of a column of said first memory and a row of said second memory can be considered as a respective group of said products; and
means for accumulating each said group of products to generate a respective accumulation result;
a multiplexer having a first input port for receiving said accumulation results that occur every $n^{th}$ of consecutive sample intervals, having a second input port, and having an output port to which its said first input port is selected during said every $n^{th}$ of the consecutive sample intervals and to which its said second input port is selected during said every other of the consecutive sample intervals;
$(mn-1)$ delay elements each having a respective input port, having a respective output port, and exhibiting a one-sample-interval delay between its input and output ports, said delay elements being identified by consecutive respective ordinal numbers first through $(mn-1)^{th}$;
a cascade connection of said $(mn-1)$ delay elements in order of their ordinal numbers, to form a delay line having an overall delay of $(mn-1)$ sample intervals between the output port of said multiplexer and its second input port, whereby the matrix product of the matrices temporarily stored in said first and second matrices is available by columns at any point along said delay line.

37. A chain-serial matrix multiplier comprising:
means for generating a first control signal that has a first state during odd-numbered ones of consecutively ordinally numbered sample intervals and that has a second state during eve-numbered ones of those sample intervals;
first, second, and third multiplexers each having a respective output port, each having a respective first input port selectively connected to its said output port responsive to said first control signal having its first state, and each having a respective second input port selectively connected to its said output port responsive to said first control signal having its second state;
a first delay element having an input port connected from the output port of said first multiplexer, having an output port connected to the second input port of said first multiplexer, and exhibiting one-sample-interval delay between its input and output ports;
a first delay line having an input end connected from the output port of said second multiplexer and having an output end connected to the first input port of said first multiplexer and to the second input port of said second multiplexer, said first delay line formed by the cascade connection of second through fourth delay elements, each having respective input and output ports and exhibiting a one-sample-interval delay between its input and output ports;
a second delay line having an input port connected from the output port of said third multiplexer and and having an output end connected to the first input port of said second multiplexer and to the second input port of said third multiplexer, formed by the cascade connection of fifth through ninth delay elements, each having respective input and output ports and exhibiting a one-sample-interval delay between its input and output ports;
means for generating a second control signal that alternates between first and second states, once each sixteen sample intervals;
fourth and fifth multiplexers, each having a respective output port, each having a respective first input port selectively connected to its said output port responsive to said second control signal having its first state, and each having a respective second input port selectively connected to its said output port responsive to said second control signal having its second state, the output port of said fourth multiplexer connected to the first input port of said third multiplexer;
a tenth delay element having an input port connected from the output port of said fifth multiplexer, having a output port connected to the second input port of said fourth multiplexer, and exhibiting a one-sample-interval delay between its input and output ports;
an eleventh delay element having an input port connected from the output end of said first delay line, having an output port connected to the second input port of said fifth multiplexer and exhibiting a one-sample-interval delay between its input and output ports;

a twelfth delay element having an input port, having an output port connected to the second input port of said fourth multiplexer, and exhibiting a one-sample-interval delay between its input and output ports;

a thirteen delay element having an input port, having an output port connected to the input port of said twelfth clocked delay element and to the second input port of said fifth multiplexer, and exhibiting a one-sample-interval delay between its input and output ports;

a sixth multiplexer having an output port, having a first input port selectively connected to its said output port responsive to said first control signal having its first state, and having a second input port selectively connected to its said output port responsive to said first control signal having its second state;

a third delay line between the output port of said sixth multiplexer and its second input port, formed by the cascade connection of fourteenth through eighteenth delay elements, each having respective input and output ports and exhibiting one-sample-interval delay therebetween, the output end of said third tapped delay line connecting to the input port of said thirteenth delay element;

a multiplier for multiplying a multiplicand signal by a multiplier signal to generate a product signal at an output port thereof;

means for applying signal samples from the output end of said second delay line to said multiplier, at least at selected times, as one of said multiplier and multiplicand signals;

means for applying the other of said multiplier and multiplicand signals to said multiplier; and an accumulator, accumulating each successive pair of products with alternate samples of said second signal, thereby to generate at least portions of all except initial ones of signal samples supplied to the first input port of said sixth multiplexer.

38. A chain-serial matrix multiplier as set forth in claim 37 wherein said accumulator comprises:

a nineteenth delay element having an input port, having an output port connecting to the first input port of said sixth multiplexer, and exhibiting a one-sample-interval-delay between its input and output ports;

a seventh multiplexer having an output port, having a first input port connected from the output port of said first clocked delay element and selectively connected to its said output port responsive to said first control signal having its first state, and having a second input port connected from the output port of said nineteenth delay element and selectively connected to its said output port responsive to said first control signal having its second state;

a first adder having a first input port, having a second input port connected from the output port of said seventh multiplexer, and having an output port for providing a sum signal applied at least at selected times to the input port of said nineteenth delay element; and twentieth and twenty-first delay elements, each having respective input and output ports and exhibiting one-sample-interval delay therebetween, in cascade connection between the output port of said first multiplier and the first input port of said first adder.

* * * * *